United States Patent [19]
Phillips et al.

[11] Patent Number: 5,909,193
[45] Date of Patent: Jun. 1, 1999

[54] DIGITALLY PROGRAMMABLE RADIO MODULES FOR NAVIGATION SYSTEMS

[75] Inventors: William C. Phillips, Ellicott City; Michael V. Pascale, Millersville; Ronald W. Minarik, Lutherville; Kenneth M. Schmidt, Ellicott Ciry; Benjamin F. Weigand, Ellicott City; Walter M. Dirndorfer, Linthicum, all of Md.

[73] Assignee: Northrop Grumman Corporation, Los Angeles, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/522,057

[22] Filed: Aug. 31, 1995

[51] Int. Cl.$^6$ ....................................................... G01S 1/16
[52] U.S. Cl. .............................. 342/410; 342/413; 701/17
[58] Field of Search .................................... 342/410–413, 342/407; 364/922.8, 925, 925.1–925.4, 919.5, 922.5, 919.2, 429, 430

[56] References Cited

U.S. PATENT DOCUMENTS

| | | |
|---|---|---|
| 3,130,431 | 4/1964 | Murphy . |
| 3,332,080 | 7/1967 | Verwey . |
| 3,495,248 | 2/1970 | Raether et al. . |
| 3,525,979 | 8/1970 | Kunkel . |
| 3,581,073 | 5/1971 | Visher . |
| 3,946,393 | 3/1976 | Dunne et al. . |
| 3,981,440 | 9/1976 | Richardson . |
| 4,097,922 | 6/1978 | Vito et al. . |
| 4,137,531 | 1/1979 | Pell . |
| 4,184,158 | 1/1980 | Smith, 2nd ............................. 342/411 |
| 4,215,346 | 7/1980 | Smith, 2nd ............................. 342/404 |
| 4,435,711 | 3/1984 | Ho et al. . |
| 4,525,865 | 7/1985 | Mears ..................................... 455/186 |
| 4,533,917 | 8/1985 | Reed . |
| 4,658,359 | 4/1987 | Palatucci et al. ........................ 364/424 |
| 4,843,399 | 6/1989 | Bongiorno et al. ...................... 342/404 |
| 4,984,295 | 1/1991 | Engstrom et al. ....................... 455/186 |
| 5,019,910 | 5/1991 | Filmer ....................................... 455/12 |
| 5,052,049 | 9/1991 | Andros et al. . |
| 5,117,422 | 5/1992 | Hauptschein et al. . |
| 5,144,314 | 9/1992 | Malmberg . |
| 5,165,055 | 11/1992 | Metsler . |
| 5,220,557 | 6/1993 | Kelley . |
| 5,317,316 | 5/1994 | Sturm et al. . |
| 5,323,332 | 6/1994 | Smith et al. ............................ 342/411 |
| 5,334,982 | 8/1994 | Owen . |
| 5,390,360 | 2/1995 | Scop et al. . |
| 5,471,509 | 11/1995 | Wood et al. . |
| 5,488,356 | 1/1996 | Martinovich ........................ 340/825.22 |
| 5,533,072 | 7/1996 | Georgiou et al. . |
| 5,584,051 | 12/1996 | Goken . |
| 5,604,927 | 2/1997 | Moore . |

FOREIGN PATENT DOCUMENTS

| | | |
|---|---|---|
| 0399200A2 | 11/1990 | European Pat. Off. . |
| 0511511A2 | 11/1992 | European Pat. Off. . |
| 0511730A2 | 11/1992 | European Pat. Off. . |
| 0513443A1 | 11/1992 | European Pat. Off. . |
| 0534255 | 3/1993 | European Pat. Off. . |
| 0553862A2 | 8/1993 | European Pat. Off. . |
| WO9510889 | 4/1995 | WIPO . |

Primary Examiner—Gregory C. Issing
Attorney, Agent, or Firm—Walter G. Sutcliff

[57] ABSTRACT

A programmable digital radio is configured to perform navigation functions. A receiver in the programmable digital radio receives analog signals from a navigation unit and digitizes the analog signals to produce digital navigation signals. The digital navigation signals are processed digitally and valid navigation information is determined. Processing includes generation of baseband signals including in-phase signals and quadrature signals, AM demodulation, filtering, decimating, demultiplexing, discrete fourier transformation, and function processing according to a selected function. The selected functions may include Localizer, Marker Beacon and Glideslope.

11 Claims, 12 Drawing Sheets

FIG.3

ILS SOFTWARE - TIMING

INDIVIDUAL TDM SEQUENCE (msec.)
145.08

| STARTUP | LOCALIZER 33.36 | TUNE 6.50 | MB 10.00 | TUNE 4.00 | GLIDESCOPE 33.36 | TUNE 4.00 | LOCALIZER 33.36 | TUNE 6.50 | MB 10.00 | TUNE 4.00 |

FIG.4

SEQUENCE REPETITION STRUCTURE
618.32

| SEQUENCE 145.08 | SEQUENCE 145.08 | SEQUENCE 145.08 | SEQUENCE 145.08 |

JITTER:  3.00  12.00  15.00  8.00

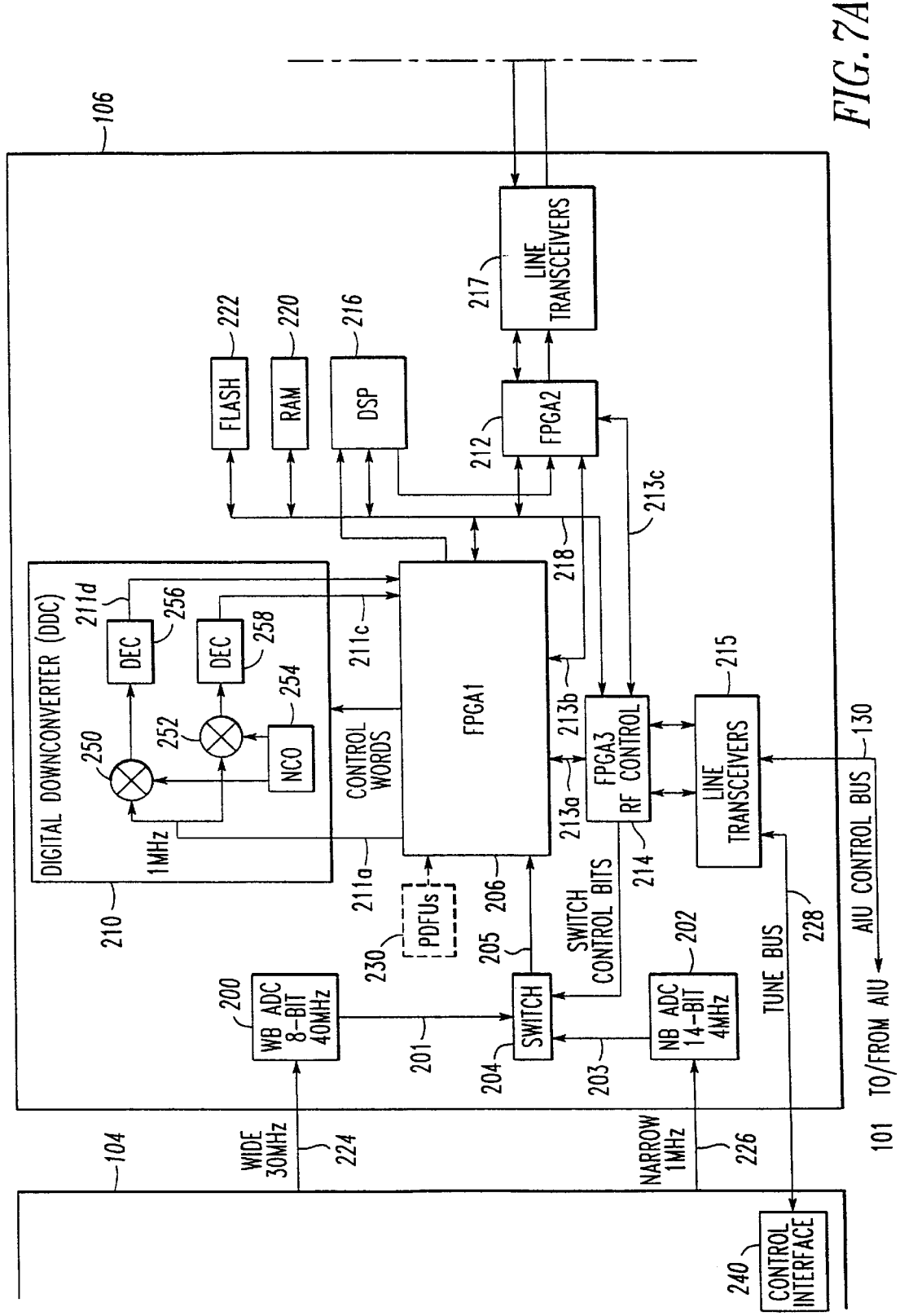

DIGITALLY PROGRAMMABLE RADIO MODULES FOR NAVIGATION SYSTEMS

CROSS REFERENCE TO RELATED APPLICATIONS

This application is related to concurrently filed U.S. application entitled DIGITALLY PROGRAMMABLE MULTIFUNCTION RADIO SYSTEM ARCHITECTURE, having U.S. Ser. No. 08/522,050; WIDE-BAND RADIO-FREQUENCY CONVERTER HAVING MULTIPLE USE OF INTERMEDIATE FREQUENCY TRANSLATORS, having U.S. Ser. No. 08/322,513; COMMON RECEIVE MODULE FOR A PROGRAMMABLE DIGITAL RADIO, having U.S. Ser. No. 08/528,206; COMMON TRANSIT MODULE FOR A PROGRAMMABLE DIGITAL RADIO, having U.S. Ser. No. 08/522,058 VHF-AM RADIO SYSTEM, having U.S. Ser. No. 08/522,056 and DIGITALLY PROGRAMMABLE RADIO MODULES FOR TRANSPONDER SYSTEMS, having U.S. Ser. No. 08/522,057, all incorporated by reference herein.

BACKGROUND OF THE INVENTION

1. Field of the Invention

The present invention is directed to a digitally programmable radio including a receiver and a transmitter that can be digitally reconfigured to operate over a broad radio band and with different signal formats and, more particularly, to a system that provides dynamically programmable and configurable channels using digital channel components to maximize reconfiguration flexibility for use in navigation systems such as Instrument Landing Systems (ILS). Although ILS is normally referred to in this application, other navigation systems are also similar and may be easily developed by one skilled in the art.

2. Description of the Background Art

Many commercial and military applications require multiple communication, navigation, and identification (CNI) or telemetry radio frequency (RF) functions to be performed at a single location. The conventional method for servicing multiple CNI functions is to use independent radio frequency (RF) receivers, each covering a specific portion of the RF band corresponding to a specific CNI function.

Various applications require greater than 10 different types of CNI radios. At one extreme, communication, navigation and identification (CNI) multi-radio suites are comprised of an independent and different type radio channels for each radio functional thread. At the other extreme, integrated programmable radio systems, now in development, cross-couple various elements of multiple channels, which results in a highly complex system of tightly coupled resources.

Both approaches, including hybrids of the two approaches, have advantages as well as major disadvantages. For example, when redundancy is required the independent channel systems must have separate and complete backup radios for all important critical systems, such as instrument landing systems (ILS), which can be very costly. Further, size and weight of the system precludes implementation of multiple CNI functions in many manpack and vehicular applications. The cross-coupled systems are extremely difficult to maintain because fault isolation is difficult due to the complexity of signal distribution and switching; discourage addition of new or modified functions due to a high cost of system redesign and recertification.

A programmable common digital radio is needed which provides an integrated solution for many different types of multi-function CNI suites provided in a small size, with a light weight at a low cost, without the disadvantages suffered by other architectures as described above.

SUMMARY OF THE INVENTION

Accordingly, it is an object of the present invention to provide a programmable radio that can be quickly reconfigured for a navigation function.

It is an additional object of the present invention to provide a radio which will operate over the 1.5 MHz to 1870 GHz range.

It is a further object of the present invention to provide common identical modules that can be easily reconfigured for many different types of radio functions including a navigation function thus allowing reduction in the number of spares or backup modules required for a given level of system availability.

It is an object to provide a system in which the channels can be dynamically reprogrammed.

It is another object of the present invention to provide modules in which hardware and software upgrades can be made at the module level rather than impacting two or more modules or the whole system.

It is also an object of the present invention to provide modules that are arranged in a way that permits relatively easy maintenance and checkouts for performance as a navigation system.

It is a further object of the present invention to provide a programmable radio which performs navigation functions at a lower cost than traditional systems.

It is an additional object of the present invention to use high speed digital techniques to properly and efficiently navigate.

It is a still further object of the present invention to provide a navigation function in a completely reprogrammable radio to allow implementation in a multiple function system.

It is an object of the present invention to perform marker beacon, glide slope and localizer functions on navigation pulse trains which may be interleaved with other navigation pulse trains.

The above objects can be accomplished by a system that partitions or divides the functions of a radio channel into two major functions:

1) antenna interface (and power amplification in the case of transmitting); and 2) mixing, modulation/demodulation and signal processing and further partitioning the mixing through signal processing functions into the functions of:

a) programmable analog mixing and b) programmable digital demodulation/modulation and signal processing. Control and user interface functions, if needed for a particular application are also functionally partitioned. A typical received RF signal pathway will encounter an antenna, an antenna interface unit and a receive module. The receive module is partitioned into an analog submodule that performs mixing and down conversion to produce analog common intermediate frequency signals and a digital submodule that converts the analog common intermediate frequency signal into a digital signal. The digital signal may then be processed in a variety of ways by programmable hardware and software. Navigational information may then be displayed, reported, etc. to an interested party.

BRIEF DESCRIPTION OF THE DRAWINGS

FIG. 3 illustrates an individual time division multiplexed sequence of intermediate signals for an Instrument Landing System.

FIG. 4 illustrates a sequence repetition structure of the individual time division multiplexed sequences for the Instrument Landing System.

FIGS. 7A and 7B illustrate a block diagram of a digital submodule of a programmable common receive module in the digital programmable radio configured for the Instrument Landing System.

DISCLOSURE OF THE INVENTION

Figure 1:
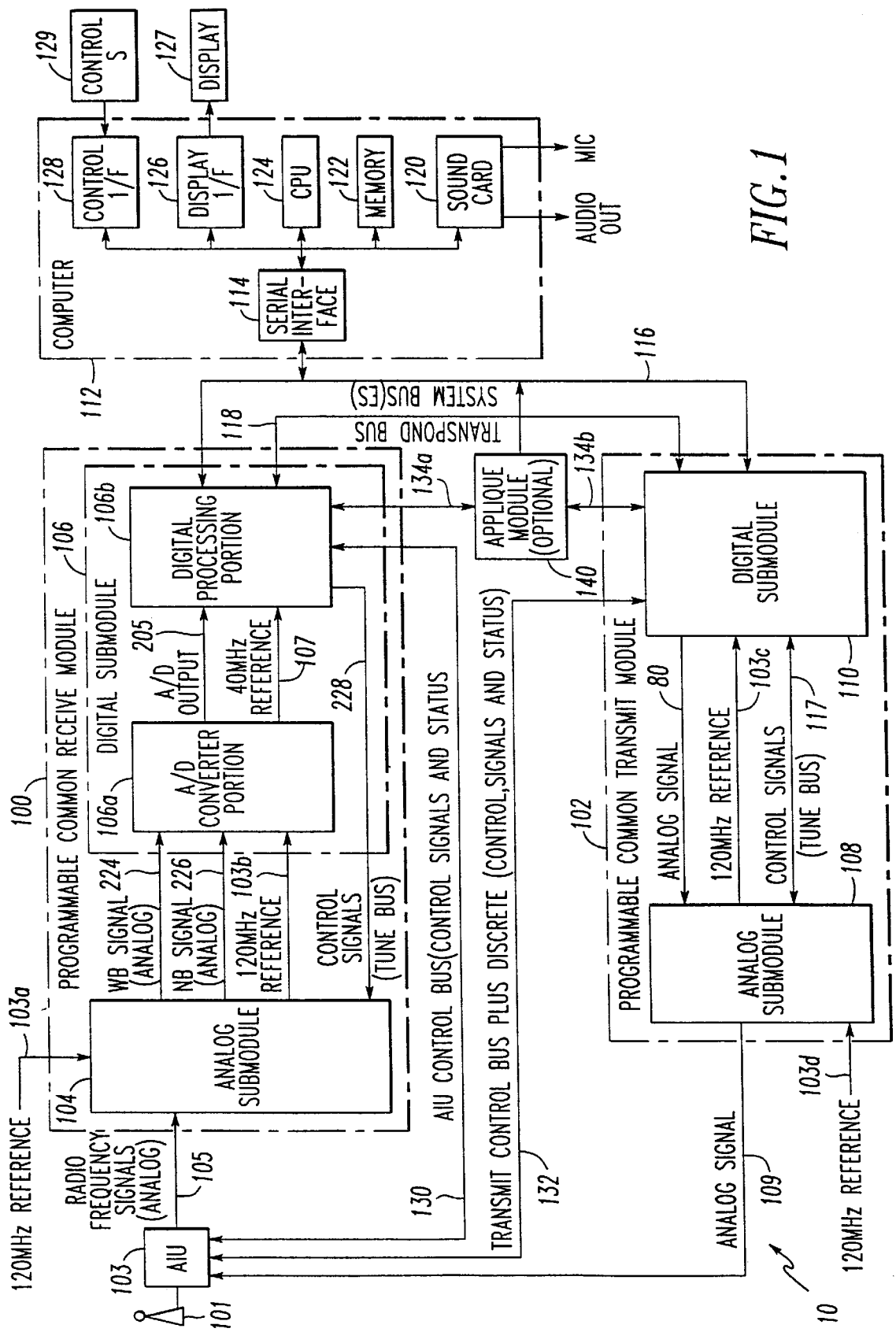
FIG. 1 is a block diagram of a digital programmable radio with receive and transmit channels.

FIG. 1 is a block diagram illustrating a programmable common receive module (PCRM) 100 and a programmable common transmit module (PCTM) 102. The PCRM 100 comprises an analog submodule 104 and a digital submodule 106. The analog submodule 104 receives radio frequency (RF) signals within a range of interest, in this example, 2 MHz to 2000 MHz and outputs intermediate frequency (IF) signals. The analog submodule 104 of the PCRM 100 is described in related U.S. disclosure entitled WIDE-BAND RADIOFREQUENCY CONVERTER HAVING MULTIPLE USE OF INTERMEDIATE FREQUENCY TRANSLATORS and also in COMMON RECEIVE MODULE FOR A PROGRAMMABLE DIGITAL RADIO, and the digital submodule is described in related U.S. disclosure entitled COMMON RECEIVE MODULE FOR A PROGRAMMABLE DIGITAL RADIO, both incorporated herein by reference.

The PCTM 102 is not used in navigation systems although details of the PCTM may be found in the related U.S. disclosure entitled COMMON TRANSMIT MODULE FOR A PROGRAMMABLE DIGITAL RADIO, incorporated herein by reference.

A system bus 116 couples the PCRM 100 to external devices. The system bus 116 also connects the digital submodule 106 of the PCRM 100 to the digital submodule 110 of the PCTM 102. Specifically, the system bus 116 couples external devices such as a computer 112, a UART 114, and a sound card 120. Additional buses may couple the PCRM 100 to the PCTM 102 for use in other radio applications or for further functions, as described in the related U.S. disclosures.

The PCRM 100 is preferably comprised of a single module (a plug-in module for many applications) that receives RF (analog) signals from an antenna interface unit (AIU) 103, described in more detail in the related DIGITALLY PROGRAMMABLE MULTIFUNCTION RADIO SYSTEM ARCHITECTURE disclosure or from a distribution network and outputs relatively low-speed serial digital data. Inside the PCRM 100, RF signals are translated in frequency through various IFs, digitally sampled and processed according to the CNI programmed configuration, and routed to an appropriate digital output. Containment of major signal operations in a single unit greatly facilitates logistics, built-in test/fault-isolation test (BIT/FIT) and maintenance.

An antenna 101 is coupled to the PCRM 100 through, for example, an antenna interface unit, power amplifier module 103. The antenna 101 receives a signal and provides an analog output signal to the PCRM 100. The PCRM 100 performs analog functions of converting the received RF signal into a final intermediate frequency signal using an analog frequency synthesizer and multiple frequency conversion stages. Additionally, analog-to-digital conversion of a final intermediate frequency signal into a digital signal is performed in either the analog submodule 104 or digital submodule 106 as detailed in the DIGITALLY PROGRAMMABLE MULTIFUNCTION RADIO SYSTEM ARCHITECTURE and COMMON RECEIVE MODULE FOR A PROGRAMMABLE DIGITAL RADIO. Further, special signal processing is performed in the digital submodule and a digital information signal is provided.

The digital submodule 106 includes reconfigurable units which are each reconfigurable to provide different functions for receiving signals for different radio communication applications.

Figure 2A:
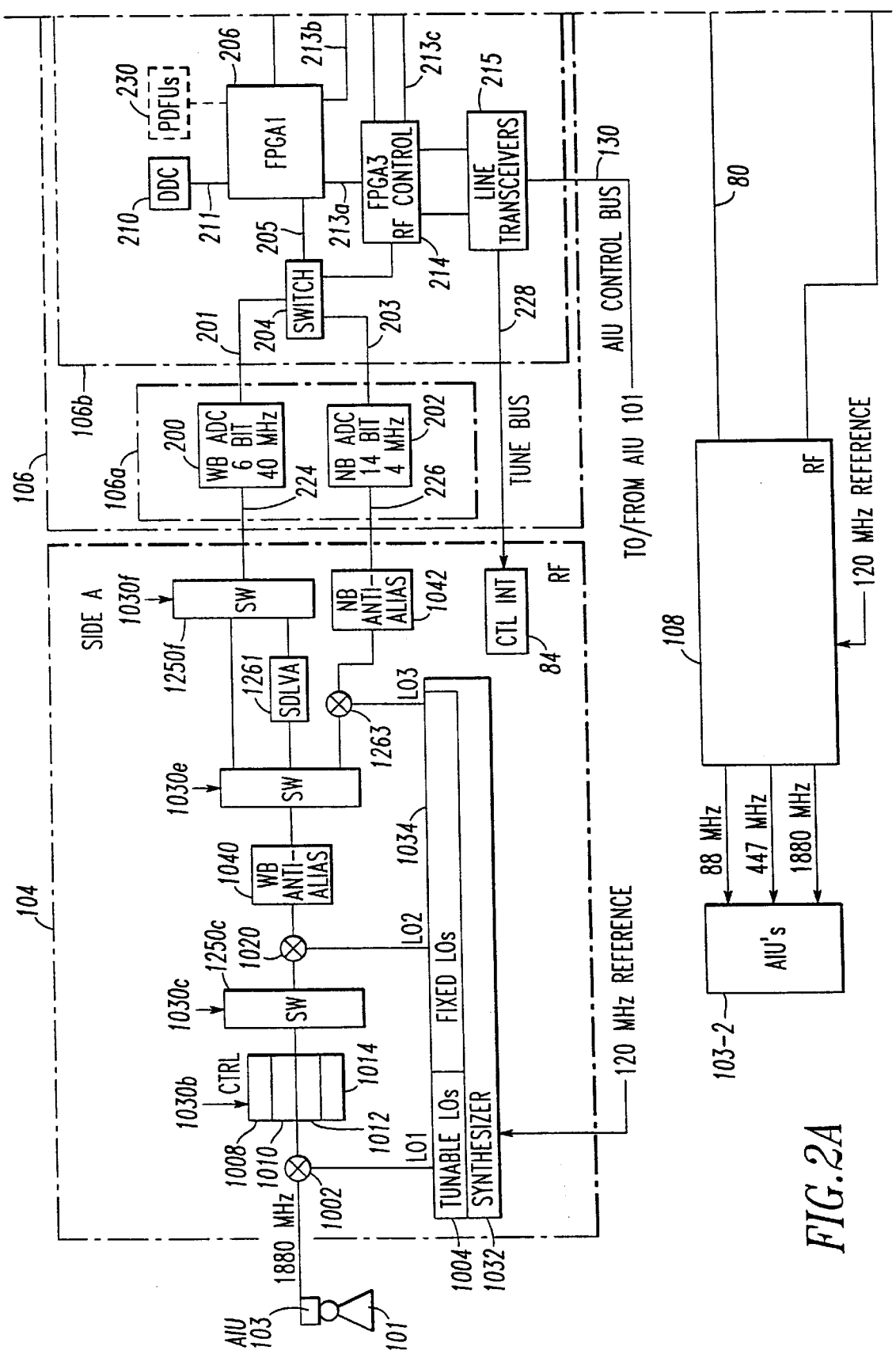
FIGS. 2A and 2B illustrate a more detailed block diagram of the digital programmable radio showing a programmable common receive module.
Figure 2B:
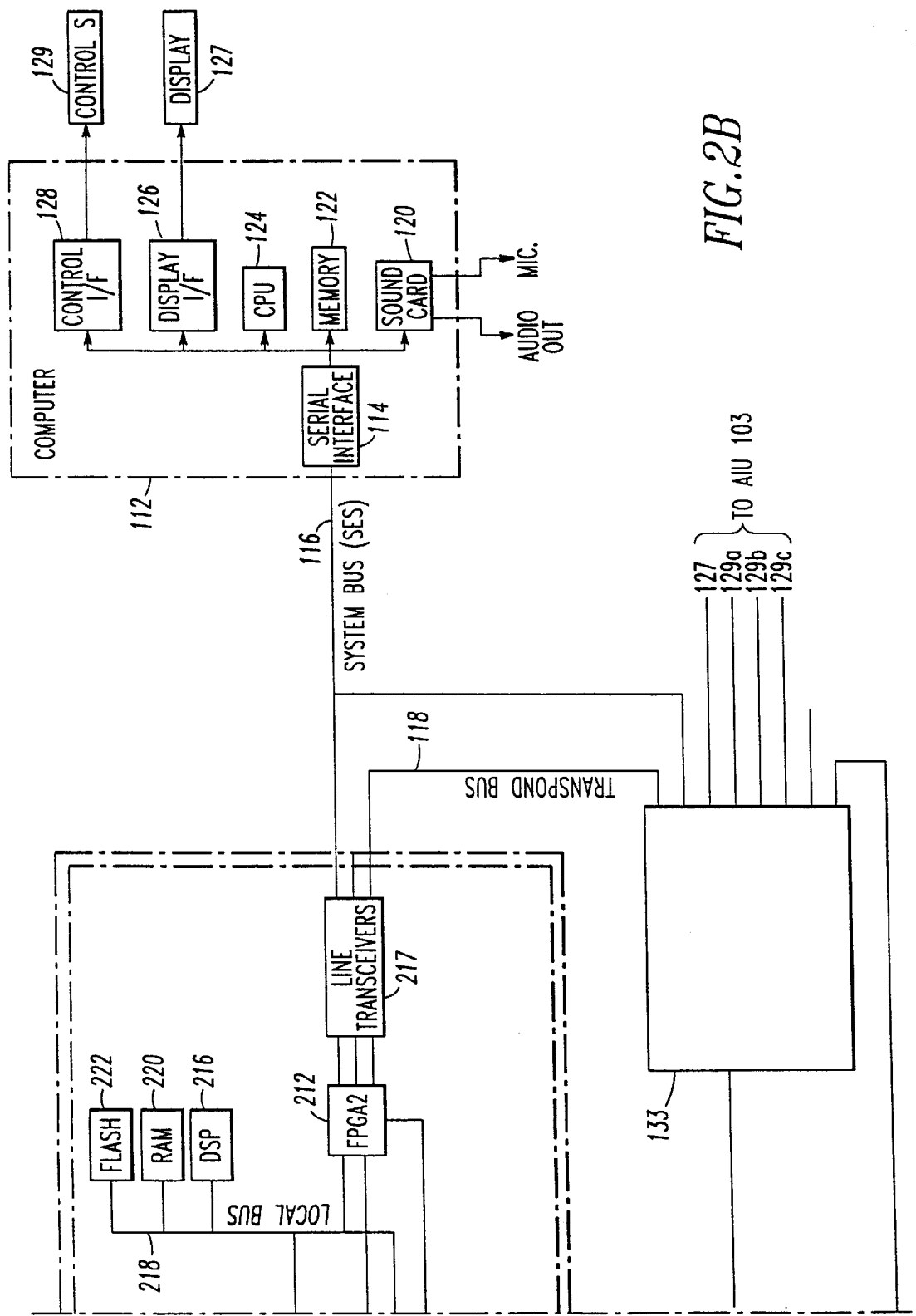

FIG. 2 provides a more detailed drawing of the analog submodule 104 and digital submodule 106. The analog and digital submodules 104 and 106, respectively of the programmable common receive module (PCRM) 100 can service a wide range of CNI functions, including AIR TRAFFIC CONTROL RADAR BEACON, INSTRUMENT LANDING SYSTEM, VHF RADIO and others as detailed in the related DIGITALLY PROGRAMMABLE MULTIFUNCTION RADIO SYSTEM ARCHITECTURE and COMMON RECEIVE MODULE FOR A DIGITALLY PROGRAMMABLE RADIO disclosures.

The flexible and functionally efficient digital processing architecture provided by the digital submodule 106 includes a combination of functional hardware elements such as, for example, one or more ADCs, including a 8-bit wide band ADC 200 operating at 40 MHz and a 14-bit narrow band ADC 202 operating at 4 MHz; one or more reconfigurable format units, commonly referred to as field-programmable gate arrays or similar dynamically configurable units such as FPGA1 206, FPGA2 212 and FPGA3 214; one or more dynamically configurable digital downconverters (DDC) with associated filtering/decimation units such as DDC 210; one or more sequential and/or parallel instruction processors sometimes referred to as central processing units (CPUs) or digital signal processors (DSPs) such as DSP 216; memory such as random access memory (RAM) 220; and nonvolatile memory (FLASH) 222; one or more dynamically configurable programmable digital filter units, with either serial or parallel I/O such as PDFU 230; and receivers, transmitters and/or transceivers for I/O, such as, for example, line transceivers 215 and 217.

The digital submodule receives an analog signal 224 or 226 from the analog submodule 104 that is band limited to either wide band or narrow band, respectively. In the ILS Navigation system, this signal is a narrow band signal. This narrow band signal is supplied to the A/D Converter Portion 106a of the digital submodule 106. Since the signal is narrow band, it may be, for example, an IF narrow band signal limited to ±200 kilohertz about 1 MHz, resulting in a total of 400 kilohertz of IF bandwidth maximum.

In the present example, two analog to digital converters (ADC) are used: one for converting a narrow band (NB) signal 202 and one for converting a wide band signal (WB) 200. Specifically, a wide band signal (WB) 224 at 30 MHz is supplied to an 8-bit 40 MHz wide band analog to digital converter (WB ADC) 200 such as, for example, an AD9012AJ from Analog Devices.

The narrow band (NB) signal 226 is supplied to a 14-bit 4 MHz narrow band analog to digital converter (NB ADC) 202 such as, for example, an ADS944MC from Datel. The signal flow for various RF input ranges and radio function types within the analog submodule 104 is discussed in the related U.S. disclosure entitled WIDE-BAND RADIO-FREQUENCY CONVERTER HAVING MULTIPLE USE OF INTERMEDIATE FREQUENCY TRANSLATORS.

For an ILS system, the NB signal 226 is supplied to the NB ADC 202. Both the WB ADC 200 and the NB ADC 202 are coupled to a converter switch (SW) 204 or a multiplexer which controls which signal is transferred to the remaining portion of the digital submodule 106, i.e., the digital processing portion 106b. The SW 204 is controlled by switch control bits which indicate whether the WB 224 or NB 226 signal is to be transmitted to the digital processing portion 106b. In this case, the NB signal 226 is selected. Thus, the data received from the NB ADC 202, in this example 14 bits of data, are transmitted with a data valid bit and a clock bit to a first field programmable gate array (FPGA1) 206 as a selected digital signal. In the alternative, if the WB signal 224 is selected, the data received from the WB ADC 200, in this example 8 bits of data, are transmitted with a data valid bit and a clock bit to the first FPGA1 206 as the selected digital signal.

In the present invention, three FPGAs 206, 212 and 214 are used to perform selected operations. The FPGAs may be, for example, Altera Flex Parts 81188. The function of these FPGAs is controlled by configuration data, as described in the related disclosure COMMON RECEIVE MODULE FOR A PROGRAMMABLE DIGITAL RADIO. As discussed later, ultimately, these three FPGAs could be combined into a single, and perhaps more flexible, unit.

The first FPGA (FPGA1) 206 will receive the selected digital signal and depending upon the application selected and the chip configuration program loaded, perform specified functions or operations which may include, for example, data reformatting, parallel to serial conversion and vice-versa, control, pulse width discrimination, interval discrimination, mode decoding, pulse detection, and other types of signal processing.

The digital down converter (DDC) 210, such as, for example, a HSP50016 chip manufactured by Harris Semiconductor, is coupled to an A/D converted output from switch 204 via FPGA1 206 and to the local bus 218 via FPGA1 206. The DDC 210 may be used, for example, to perform frequency down conversion, fine tuning, filtering and decimation of the selected digital signal.

The processor (DSP) 216 may be, for example, a TMS320C31 chip. The DSP 216 may perform various processing functions on various types of signals which may, for example, include signals associated with various narrow band and wide band radio functions. The processing functions may include, for example, decimation; filtering; waveform demodulation of any combination of amplitude, frequency and phase modulation; signal correlation; squelch; management and control of all channel resources (gain, signal path switching, tuning, interfaces both internal to the PCRM 100 as well as to external units, etc.) in both the digital submodule 106, the analog submodule 104 and the associated AIU 103 (FIG. 1); bit stream decoding including error detection and/or correction; BIT control/reporting; Fourier transforms; calculations of difference in depth of modulation (DDM); and formatting control for various terminals such as displays. Further, although sometimes performed elsewhere in the receive channel, the DSP 216, depending upon the processing power implemented, can perform message processing, network functions, and processing of low-data rate speech algorithms.

A second FPGA (FPGA2) 212 may be programmed to be configured, for example, to perform interface operations between the local bus 218 and several elements of the digital submodule 106. Further, the FPGA 212 may also, for example, perform interface operations to a system bus 116, a transpond bus 118 and an applique bus 134a via transceivers located in a multi-transceiver package 217.

A third FPGA (FPGA3) 214, also coupled to the local bus 218, may be configured to perform RF control functions, including providing control bits via a tune bus 228 to the analog submodule 104 of the PCRM 100 through, for example, a transceiver in a multi-transceiver package 215; and via an AIU control bus 130 to the associated AIU 103 also through, for example, a transceiver in the multi-transceiver package 215. The FPGA3 214 may also be configured to perform control functions of various elements of the digital submodule 106 by providing control bits.

In addition, memory may be coupled to the local bus 218 and may include, for example, a 128K bits×32 bits wide random access memory (RAM) 220 and a 128K bits×32 bits wide nonvolatile memory such as the common "FLASH" memory or EEPROM (FLASH) 222. The RAM 220 and the FLASH 222 are used to store application specific information, including FPGA configuration data, used during initialization and when switching applications.

The analog and digital submodules 104 and 106 may be configured to perform specific functions depending on an application desired. The structure of the analog and digital submodules 104 and 106 permits changing the configuration to perform a different application within a very short period of time, without requiring a change in hardware. Methods for reconfiguration are described in detail in the related COMMON RECEIVE MODULE FOR A PROGRAMMABLE DIGITAL RADIO and COMMON TRANSMIT MODULE FOR A PROGRAMMABLE DIGITAL RADIO disclosures. Each FPGA 206, 212 and 214, and other elements if necessary, is transferred gate configuration information pertaining to the specific application selected when the power is initialized. Additionally, the selected application may be altered any time during use, which is also detailed in the related COMMON RECEIVE MODULE FOR A PROGRAMMABLE DIGITAL RADIO disclosure.

Various external interfaces to the digital submodule 106 are completely programmable in a same or similar manner as the digital submodule 106 is programmable for various radio functions. Specifically, external I/O programming and configuration data can be downloaded to the RAM 220 from an external unit, such as, for example, the computer 112, via, for example, the system bus 116 or, if partitioned separately, a control/data bus as described in the related U.S. disclosures DIGITALLY PROGRAMMABLE MULTIFUNCTION RADIO SYSTEM ARCHITECTURE, COMMON RECEIVE MODULE FOR A PROGRAMMABLE DIGITAL RADIO and COMMON TRANSMIT MODULE FOR A PROGRAMMABLE DIGITAL RADIO.

With regard to external connections, I/O configuration data is used to configure reconfigurable format units, in this example, the FPGAs 212 and 214, to route digital bitstreams to and from each external interconnection utilized. The flow of digital signals with respect to the external interfaces, including the electrical formats (bit length, bit rate, etc.) and protocols, is under control of a sequential/parallel instruction set processor which in this example, is the DSP 216.

Thus, the common receive module 100, and particularly the digital submodule 106, has programmable external interfaces that can be used for a variety of interface applications, including control functions and signal flow. The programmable external interfaces may be serial or parallel, synchronous or asynchronous, unidirectional or bidirectional, and include standard and/or custom protocols. However, including elements necessary to meet special physical interface requirements for all types of external connections in the common receive module 100 may not be practical. Again, this is discussed in detail in the related U.S. disclosures DIGITALLY PROGRAMMABLE MULTIFUNCTION RADIO SYSTEM ARCHITECTURE and COMMON RECEIVE MODULE FOR A DIGITALLY PROGRAMMABLE RADIO.

In addition, major portions of the analog and digital submodules 104 and 106, respectively, can be combined in higher levels of integration. For example, all field programmable gate arrays (FPGAs) 206, 212 and 213 may be combined into a single element or "chip," or the entire digital circuitry including the FPGAs, the digital downconverter (DDC) 210, the DSP 216 and the memory 220 and 222 can be consolidated into a single element for possible savings in size, cost and power dissipation.

Further discussion regarding division of functions and elements and internal processing into respective submodules is disclosed in detail in the related disclosure COMMON RECEIVE MODULE FOR A PROGRAMMABLE DIGITAL RADIO.

Regardless of the specific mechanical configuration of the analog and digital submodules 104 and 106, respectively, the analog and digital portions are electrically isolated from each other in order to prevent relatively noisy digital circuits from creating unwanted extraneous signals within sensitive analog circuits. A conductive shield and possibly a frame of a material, such as mu-metal or aluminum, is preferably provided between the boards. Analog signals between the boards are generally not transmitted over coaxial cables.

To provide further isolation, the digital and analog portions preferably have separate power sources and ground lines (different ground planes) to prevent noise and ground loop problems through the power supply. To prevent noise problems, digital signals transmitted between the analog and digital portions and external connections, are differential (dual rail) signals. In addition, high-speed digital clocks associated with digital circuitry in the analog submodule 104, such as a clock for the tune bus 228, are turned off during signal reception.

The above isolation and power/ground considerations enable high speed (e.g., 40 MHz) digital circuits to be placed in the same relatively small box as the sensitive analog receive module elements.

An explanation of the use of the external bus connections is now given. For further explanation of external bus connections refer to the related U.S. disclosure entitled DIGITALLY PROGRAMMABLE MULTIFUNCTION RADIO SYSTEM ARCHITECTURE.

The system bus 116 is primarily used to:

(1) Pass demodulated message data from the PCRM 106 to the external device 112, such as a computer, associated units, and/or to other external devices not shown;

(2) Pass control data (frequency channel, antenna selection, etc.) and radio application software programs from an external controller (e.g., computer 112) to the PCRM 100; and (3) Pass channel status information collected in the PCRM 100 to the external controller 112. In some applications, the system bus 116 can serve as a multiple access message (i.e., intercom) bus among various radio channels and various external user stations (not shown) coupled to the system bus 116.

For a description of system bus partitioning, please refer to the related U.S. disclosures entitled DIGITALLY PROGRAMMABLE MULTIFUNCTION RADIO SYSTEM ARCHITECTURE COMMON RECEIVE MODULE FOR A PROGRAMMABLE DIGITAL RADIO and COMMON TRANSMIT MODULE FOR A PROGRAMMABLE DIGITAL RADIO.

The system bus 116 is preferably differential (i.e., dual rail) for better noise immunity; however, the system bus 116 can also be configured as single ended for some applications by bypassing line transceivers 217 in the digital submodule 106 associated with the system bus 116. Also, the system bus 116 is preferably configured to be asynchronous, i.e., performing a UART (Universal Asynchronous Receiver/Transmitter) function, although the system bus 116 can also be synchronous by providing an associated clock line.

An AIU control bus 130 is a bidirectional bus that, depending upon the radio application, passes control information to an associated AIU 103 in the same channel, to include, for example: initiation of built-in-test (BIT), filter tuning information, automatic gain control settings based upon received signal level, and relatively slow switching either for antenna selection or for the distribution of the AIU RF output to various PCRMs 106(n). Also, the AIU control bus 130 passes information (e.g., BIT status) from the AIU 103 to the PCRM 100 and ultimately to the external controller 112.

A tune bus 228 passes control information from the digital submodule 106 to the analog submodule 104. The tune bus 228 is preferably configured to be synchronous. A differential control line bus pair plus a differential clock signal may be sent along a separate line pair (not shown), although the tune bus 228 could also be configured to be asynchronous if desired. If the differential clock signal is used, it is turned off after data transfer to prevent corruption of the sensitive analog circuits of the analog portion of the PCRM 100 during signal reception.

As noted previously, not all external buses are used for every radio application. In addition, those of skill in the art can configure the FPGAs to supply interfaces with other units, where such interfaces may be serial or parallel, unidirectional or bidirectional, synchronous or asynchronous as warranted, to include both standard or custom protocols. Those of skill may also add other buses for use in this and other radio applications.

In ILS processing, three radio functions, namely Localizer (LOC), Marker Beacon (MB) and Glideslope (GS), are time interleaved in an RF signal received by the PCRM 100.

Prior to operation, the configuration programs for the LOC, MB and GS radio functions comprising the ILS application are placed in the RAM 220 as explained in the related applications, either by downloading from external memory over the system bus 116 or from the FLASH memory 222. These three radio functions are time interleaved into RF signals received and processed by the PCRM 100.

The analog submodule 104 and the digital submodule 106 are each sequentially configured and tuned to route and process each of the ILS radio functions in a repetitive time multiplex sequence described later. For example, the analog submodule 104 is sequentially configured and tuned to receive each ILS function signal, frequency translate each ILS function signal, and route the translated ILS function signal to the NB IF output at preferably 1 MHz. (Functional routing through the analog submodule 104 of a wide variety of radio functions, including the ILS radio functions, is described in the related U.S. disclosure entitled WIDE-BAND RADIO-FREQUENCY CONVERTER HAVING MULTIPLE USE OF INTERMEDIATE FREQUENCY TRANSLATORS.)

The translated ILS function signal is passed to an ADC, such as the NB ADC 202, preferably sampled at 4 MHz. As previously described, the translated ILS function signal could be sampled at higher rates, for example in an ADC sampled at 40 MHz that replaces both the WB ADC 200 and the NB ADC 202 with a single unit. A converted ILS signal is passed to the digital processing portion 106b of the digital submodule 106 which is also sequentially configured to process the same radio function passed through the analog submodule 104. A signal of each selected function of the ILS application is received for a preset amount of time. The analog submodule 104 and the digital submodule 106, are then reconfigured to a new selected ILS radio function and the new selected function is received for a preset amount of time. The sequence is then repeated.

FIG. 3 illustrates an example of an individual TDM (Time Division Multiplex) sequence for the processing of the ILS radio functions. The time sequence consists of "sampling" periods and "tune" periods. The sampling periods are shown as "LOCALIZER," "MB," and "GLIDESLOPE." The tune periods are shown as "TUNE."

At start-up, and based upon control information received via the system bus 116 from the control (not shown) associated with computer 112, the DSP 116 calculates, proportions and stores the tuning requirements between coarse tuning in the analog submodule 104 and fine tuning in the DDC 210 of digital submodule 106 for each of the radio functions that are time multiplexed. The analog submodule 104 and the digital submodule 106 are then configured and tuned to receive the LOC signal. In addition, during each subsequent tune period, the analog submodule 104 and the digital submodule 106 are configured (including tuning) to receive a next signal to be processed. By the end of the tune period, the PCRM 100 has been tuned to receive the desired signal, the ADC 200 is sampled at the desired rate, for example at 4 MHz, and the DDC 210 is downconverting and decimating (i.e., reducing the sample rate) as later described.

No start bits or framing bits are required to initiate or synchronize the ILS processing. Synchronization of hardware in the PCRM 100 is accomplished by allowing enough time in the tune period for the hardware to reconfigure for a new operating mode. The sampling periods for LOC, GS and MB end when a desired number of samples are received, which may differ for each radio function. The length of the tune period is controlled by timer interrupts generated in the DSP 216 (FIG. 2). When a timer runs out, the tune period ends and a next sampling period begins.

In this example, at start-up, as previously noted, the analog submodule 104 and the digital submodule 106 are configured and tuned to receive the LOC signal. Processing begins with a 33.36 msec LOC period. A 6.5 msec tune period follows. During this tune period, the LOC processing completes and the analog submodule 104 and digital submodule 106 are configured to receive the MB signal. A 10 msec MB period occurs, followed by a 4 msec tune period, during which the MB processing completes and the analog submodule 104 and the digital submodule 106 are configured to receive the GS signal. A 33.36 msec GS period occurs, followed by a 4 msec tune period, during which the GS processing completes and the analog submodule 104 and the digital submodule 106 are configured to receive the LOC signal. A 33.36 msec LOC period occurs, followed by a 6.5 msec tune period, during which the LOC processing completes and the analog submodule 104 and digital submodule 106 are configured to receive the MB signal. A 10 msec MB period occurs, followed by a 4 msec tune period, during which the MB processing completes and the analog submodule 104 and the digital submodule 106 are configured to receive the LOC signal.

The LOC and MB functions require a somewhat higher cycle rate than the GS function in order to process the audio tones associated with the LOC and MB functions. An entire sequence takes 145.08 msec and is repeated as shown in FIG. 4. Four different wait periods, the values of which have been predetermined by systems analysis and comprising a "jitter", are inserted prior to starting the next sequence in order to reduce the effects of synchronous AM noise sources such as aircraft propellers. The four different wait periods likewise repeat in the same order. In this example, the four wait periods are 3 msec, 12 msec, 15 msec and 8 msec, respectively. An entire sequence repetition thus takes 618.32 msec to complete.

ANALOG SUBMODULE OF PCRM

A wide band radio frequency (RF) to intermediate frequency (IF) multifunction receiver including a frequency converter obtains improved utilization of installed circuitry by employing a single tunable frequency converter for any of the RF signals in the entire band, as described in the related U.S. disclosure WIDE-BAND FREQUENCY CONVERTER HAVING MULTIPLE USE OF INTERMEDIATE FREQUENCY TRANSLATORS. The tunable frequency converter accepts any signal in the RF range of interest, for example, 2 MHz to 2000 MHz, at a tunable first frequency translator. Several different filters having different center frequencies and different bandpass widths are included in the analog submodule of the PCRM.

Figure 5A:
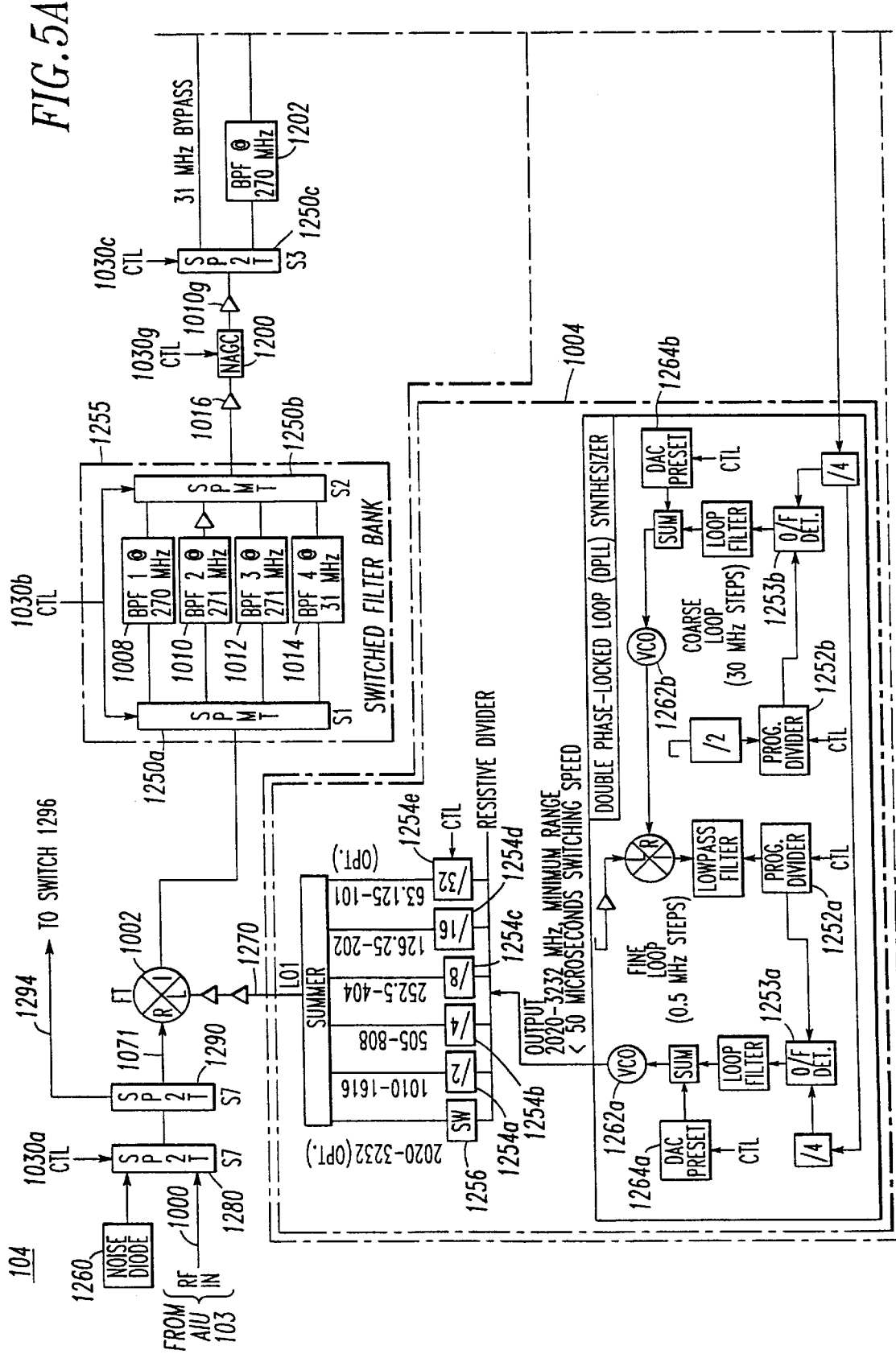
FIGS. 5A and 5B illustrate a block diagram of an analog submodule of the programmable common receive module illustrating signal flow for a navigation system.
Figure 5B:
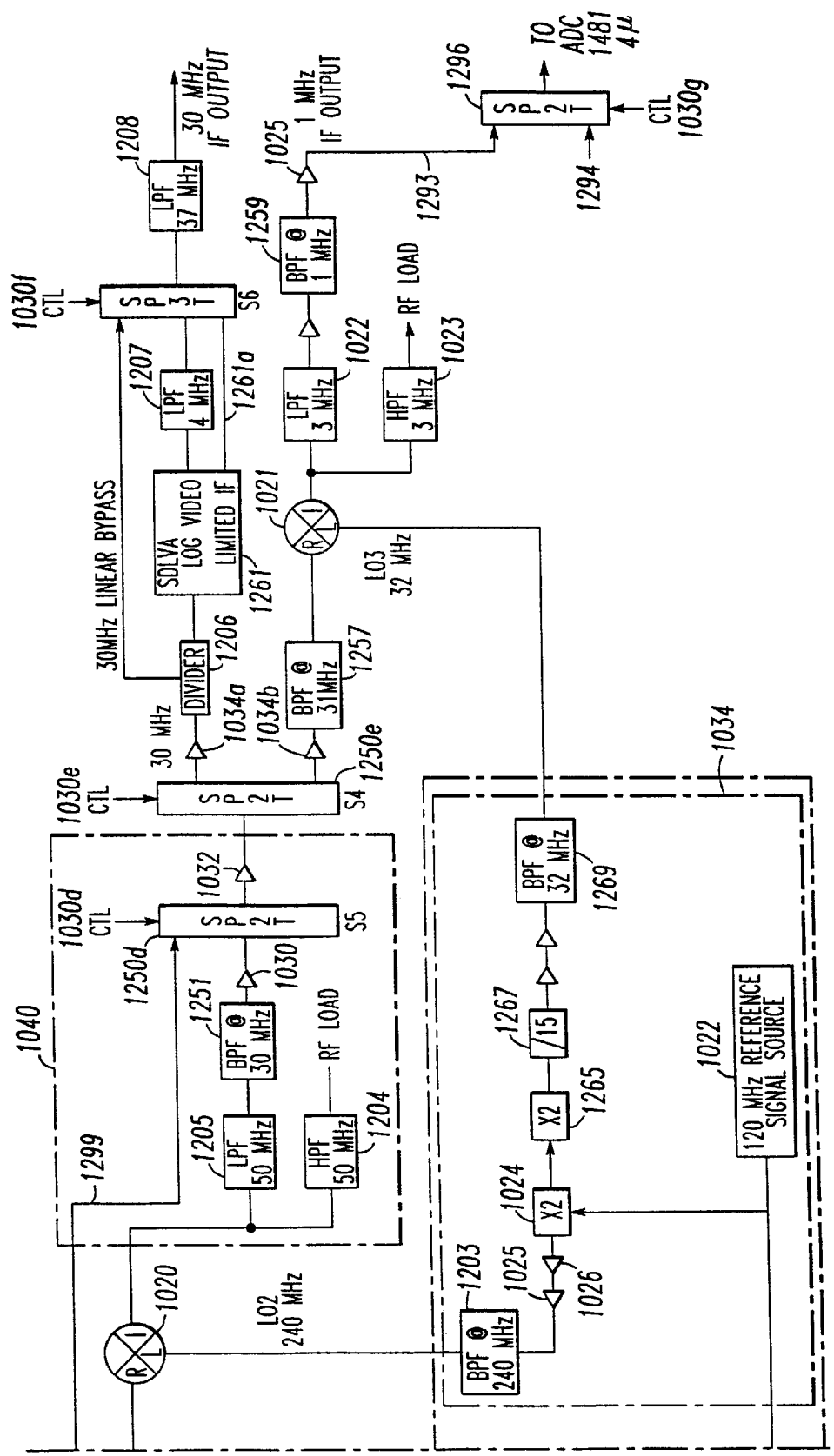

More specifically, as shown in FIG. 5, an RF input signal 1000 is received by a first switch (SP2T) 1280, such as a single pole double throw switch. Additionally, a signal, such as a test signal, from a noise diode 1260 is also supplied to the SP2T 1280. A control signal CTL 1030a, from a control interface 84, shown in FIG. 6, selects the RF input signal at SP2T 1280. The output of the SP2T 1280 is supplied to an input of a second switch, such as a single pole double throw switch 1290. The second switch 1290 has two outputs. One output 1071 is transmitted to a first frequency translator 1002, such as a single tunable frequency translator, and is used to service RF functions between approximately 1.5 MHz and 1870 MHz as described in the related disclosure. Also, to service RF functions below 1.5 MHz, output 1294 of switch 1290 is selected via control 1290b and routed directly to the 14-bit ADC 202 via switch 1296 and control 1030g. For ILS, the RF input signal is at approximately 75 MHz Marker Beacon, 108–112 MHz for Localizer and 329–335 for Glideslope.

Oscillator circuitry 1004, described in detail in the disclosure WIDE BAND RADIOFREQUENCY CONVERTER HAVING MULTIPLE USE OF INTERMEDIATE FREQUENCY TRANSLATORS, and also described in disclosure COMMON RECEIVE MODULE FOR A PROGRAMMABLE DIGITAL RADIO, provides a tunable local oscillator signal LO1 to the single tunable frequency translator 1002. The single tunable frequency translator 1002 mixes the tunable local oscillator signal LO1 with the received RF input signal to generate a mixed intermediate frequency signal. The mixed intermediate frequency signal is supplied to a second switch, such as, for example, a single pole multiple throw switch, (SPMT) 1250a and then to a selected filter of a plurality of filters, such as, for example, 1008, 1010, 1012 and 1014. Each filter of the plurality of filters corresponds to a specific application of communication, navigation and identifier functions. A control signal 1030b supplied from control interface 84a controls which of the plurality of filters 1008, 1010, 1012 and 1014 is selected to receive the output signal of the SPMT 1250a.

In the ILS application, an output signal of the SPMT 1250a is supplied to the selected filter, which is, for example, a band pass filter 1010 having a center frequency at 271 MHz and a bandwidth of 0.1 MHz for ILS Marker Beacon and a band pass filter 1014 having a center frequency at 31 MHz and a bandwidth of 0.2 for ILS Localizer and Glideslope.

A fourth switch 1250b, such as, for example, a single pole multiple throw (SPMT) receives the output signals from the selected bandpass filter 1010 or 1014, in this example, based on the control signal 1030b, and supplies a filtered signal to a first amplifier 1016. The first filtered signal is next supplied to a noise automatic gain control unit (AGC) 1200 and a second amplifier 1018. The second amplifier 1018 outputs an amplified signal for setting a level of thermal noise associated with the received RF input signals of interest, at the 1 MHz IF output 1293 of the analog submodule 104 of the PCRM 100.

The amplified signal from the second amplifier 1018 is supplied to a fifth switch, such as, for example, a single pole double throw switch (SP2T) 1250c controlled by a control signal 1030c. For signals passing through filters 1008, 1010 or 1012, the single pole double throw switch 1250c outputs a signal to a second bandpass filter 1202 having, for example, a center frequency of 270 MHz and of bandwidth greater than 20 MHz which produces a second filtered signal. The 31 MHz bypass path 1299 output of switch 1250c is used for signals passing through the 31 MHz filter 1014. A second frequency translator 1020, such as, for example, a fixed local oscillator frequency translator receives the second filtered signal and a second local oscillator signal LO2. The second local oscillator signal LO2 is supplied by a reference signal source 1022a via a frequency doubler 1204, third and fourth amplifiers 1026 and 1028, and a third bandpass filter 1203. The third bandpass filter 1203 has, for example, a center frequency of 240 Mhz.

The second frequency translator 1020 produces a translated signal which is supplied to a first low pass filter 1205, having, for example, a cut-off frequency of 50 MHz, and a first high pass filter 1204, having, for example, a cut-off frequency of 50 MHz. The first high pass filter 1204 supplies an RF load signal and the first low pass filter 1205 supplies a low pass filtered signal to a third bandpass filter 1251, having a center frequency of, for example, 30 MHz, which produces a third filtered signal. The third filtered signal is then supplied to an amplifier 1030, producing an amplified third filtered signal.

The amplified third filtered signal is supplied to a sixth switch 1250d, such as a single pole double throw switch (SP2T) controlled by a control signal 1030d which passes the amplified third filtered signal to a fifth amplifier 1032 to produce an amplified band signal. The amplified band signal is supplied to a seventh switch 1250e, such as a single pole double throw switch (SP2T).

The SP2T 1250e transmits both narrow band and wide band signals of the amplified band signal based on a control signal 1030e. In the ILS application, narrow band signals are utilized. Therefore, switch 1250e transmits the narrow band signals from amplifier 1032 to a sixth amplifier 1034b and an amplified narrow band signal is generated. The amplified narrow band signal is next provided to a fourth bandpass filter 1257 having a center frequency of, for example, 31 MHz. A fourth filtered signal is produced.

A third frequency translator 1021, such as, for example, a fixed local oscillator frequency translator receives the fourth filtered signal and a third local oscillator signal LO3. The third frequency translator 1021 produces a translated signal which is supplied to a second low pass filter 1022, having, for example, a cut-off frequency of 3 MHz, and a second high pass filter 1023, having, for example, a cut-off frequency of 3 Mhz. The second high pass filter 1023 supplies an RF load signal and the second low pass filter 1022 supplies a low pass filtered signal to a fourth bandpass filter 1259, having a center frequency of, for example, 1 Mhz, which produces a fourth filtered signal. The fourth filtered signal is then supplied to an amplifier 1025, producing an amplified fourth filtered signal. The amplified fourth filtered signal is supplied to the switch 1296 which also receives the signal from the second switch 1290. A control signal 1030g controls which signal is transmitted to the digital submodule as the narrow band signal 226, which is commensurate with standard ILS signals.

Control of the analog submodule via tune bus 228 is now described. After receiving tuning information and/or built-in test (BIT) initiation from the system bus 116 via the FPGA 212 of the digital submodule 106 (FIG. 2) and the local bus 218, the DSP 216 of the digital submodule 106 (FIG. 2) calculates and proportions tuning between an NCO 254 in the DDC 210 of the digital submodule 106 (shown, for example, in FIG. 7), and a tunable local oscillator #1 (LO1) 1004 in the analog submodule 104, shown in FIG. 5. The DSP 216 (FIG. 2) uses the tuning information for the analog submodule 104 to determine, preferably using a lookup table although calculations may be used, control settings for switches 1250a through 1250f, programmable dividers 1252a and 1252b.

Additionally, the DSP 216 (FIG. 2) uses the tuning information to determine on/off settings for output dividers 1254*a*, 1254*b*, 1254*c* and 1254*d* and optional divider 1254*e* and switch 1256. If BIT initiation is also requested, a switch 1280 is controlled such that a noise diode 1260 supplies an input test signal through various paths of the RF/IF frequency translator chain. In addition, based upon either a tuning versus control voltage estimate or actual calibration data from voltage-controlled oscillators (VCOs) 1262*a* and 1262*b*, the DSP 216 (FIG. 2) calculates and determines digital control inputs to digital-to-analog converters (DAC preset) 1264*a* and 1264*b* to provide rapid preset tuning voltages for VCOs 1262*a* and 1262*b*. As a result, rapid tuning for a double phase-locked loop (DPLL) synthesizer 1226 is also provided. Implementation of rapid tuning presets for phase-locked loops is well known to those of skill in the art.

Further, settings of any automatic gain control within the RF/IF frequency translator chain (e.g., control of NAGC 1200) or a gain control element in the AIU 103 is also determined based upon signal level measurements, in the DSP 216 of the digital submodule 106 (FIG. 2).

As shown in FIG. 2, control information such as described above, is passed to the FPGA 214 in the digital submodule 106 over, for example, the local bus 218, formatted into a serial bit stream and passed through a differential line transceiver in the transceivers unit 215 to the tune bus 228. The information on the tune bus 228 is received by a control interface 240 in the analog submodule 104.

Figure 6:
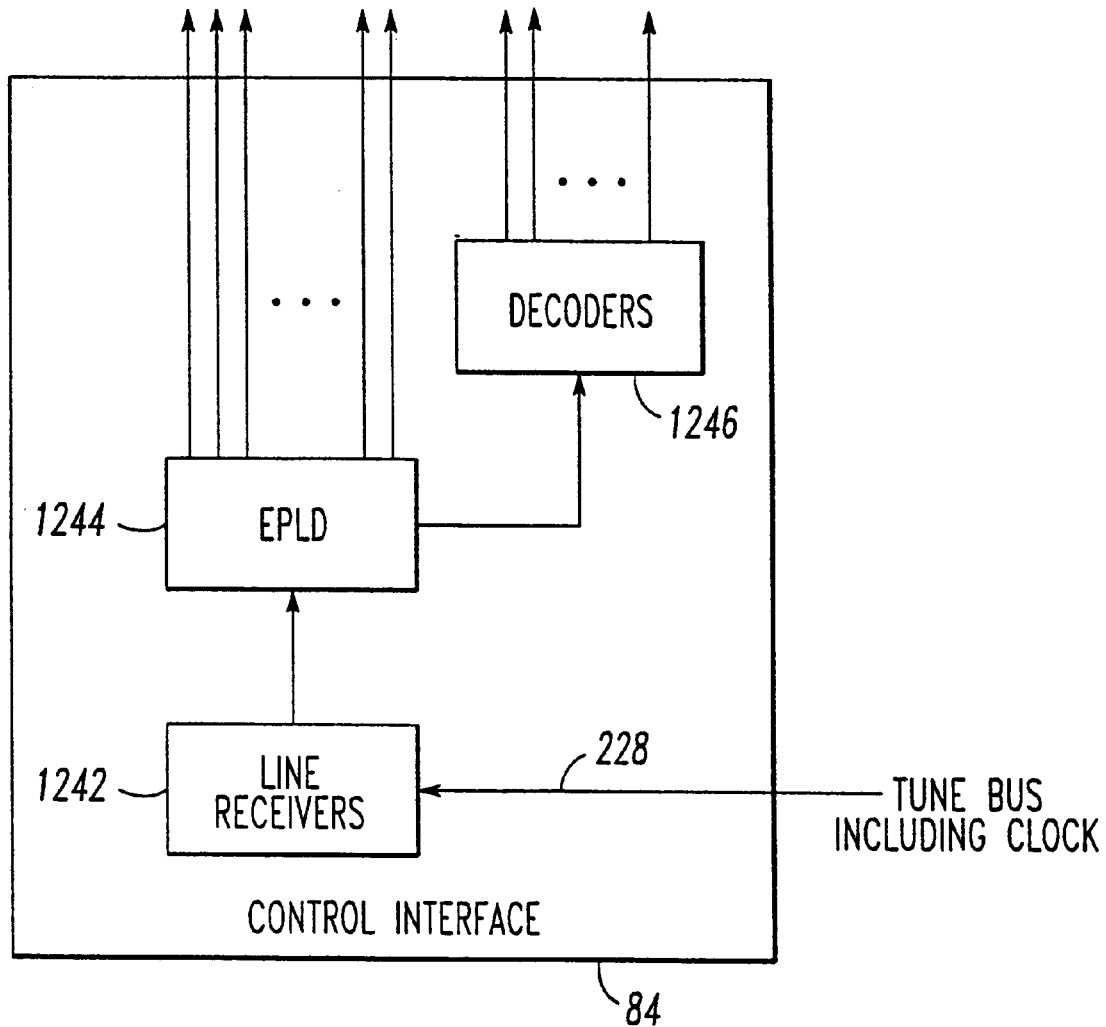
FIG. 6 is a block diagram of a control interface in the analog submodule.

FIG. 6 illustrates a configuration of the control interface 240 in the analog submodule 104. The control interface aids in providing the control signals such as 1030*a*–*g* to indicate the application and function desired.

As shown in FIG. 6, the control interface 240 is preferably comprised of line receivers 1242 such as, for example, an SN751570 available from Texas Instruments; an electronically programmable logic device (EPLD) 1244 such as, for example, a CY7C343 available from CYPRESS; and a decoder 1246 such as, for example, a 74LS139 available from Texas Instruments. Control outputs from either the EPLD 1244 or the decoders 1246 are distributed to various controlled elements of the analog submodule 104 described above. Such distribution and control are well known to those of skill in the art.

In addition, (not shown) a separate differential clock signal for the tune bus 228 may also be sent from the digital submodule 106 to the EPLD 1244 in analog submodule 104. After passing the control information from the digital submodule 106 to the analog submodule 104 via the tune bus 228, an associated differential clock signal is turned off during signal reception to avoid clock contamination of the relatively sensitive analog circuits.

Also not shown are return signals that those of skill in the art can implement to enhance operation of the PCRM 100. For example, one of these return signals could be a status signal indicating lock up of the DPLL 1226. In this example, the status signal is obtained from a programmable divider 1252*a* (such as contained in Qualcomm part 3036 which also contains a phase/frequency detector 1253*a*) and is passed through an ECL gate (not shown) and sent back to the digital submodule 106 as a differential signal for improved noise immunity. Ultimately, the differential signal is passed on to a system indicator (not shown) associated with a system controller such as the computer 112.

The analog submodule 104 also contains anti-aliasing filters to process received signals before delivery to the ADCs 200 and 202 in the digital submodule 106.

Specifically for this example, a primary anti-aliasing filtering preceding the NB ADC 202 for this process is bandpass filter (BPF) 1257 (preferably 800 KHz) located in the analog submodule 104, although the appropriate path BPF either in a switched filter bank 1255 (e.g., approximately 100 KHz, 200 KHz or 400 KHz depending upon the application) and BPF 1259 (preferably 400 KHz) also provide a degree of anti-aliasing.

Additionally, those of skill in the art can utilize the programmability of the hardware described herein to include additional interconnections between the digital submodule 106 of the PCRM 100 (via the digital processing portion 106*b*) to the analog submodule 104 of the PCRM 100.

The present configuration of the PCRM 100 allows for execution of built-in tests as discussed in detail in the related U.S. disclosure COMMON RECEIVE MODULE FOR A PROGRAMMABLE DIGITAL RADIO. Additionally, improved analog units may be located in the analog submodule 104 and improved digital units may be located in the digital submodule 106, for example, to reduce size, cost and power dissipation, or to improve performance such as finer tuning steps in the tunable LO1 270 (FIG. 5) in the analog submodule to reduce the required filter width in the analog RF/IF filters. A/D converters of faster sampling rates and/or higher dynamic range may also be issued.

DIGITAL SUBMODULE OF THE PCRM

Figure 7B:
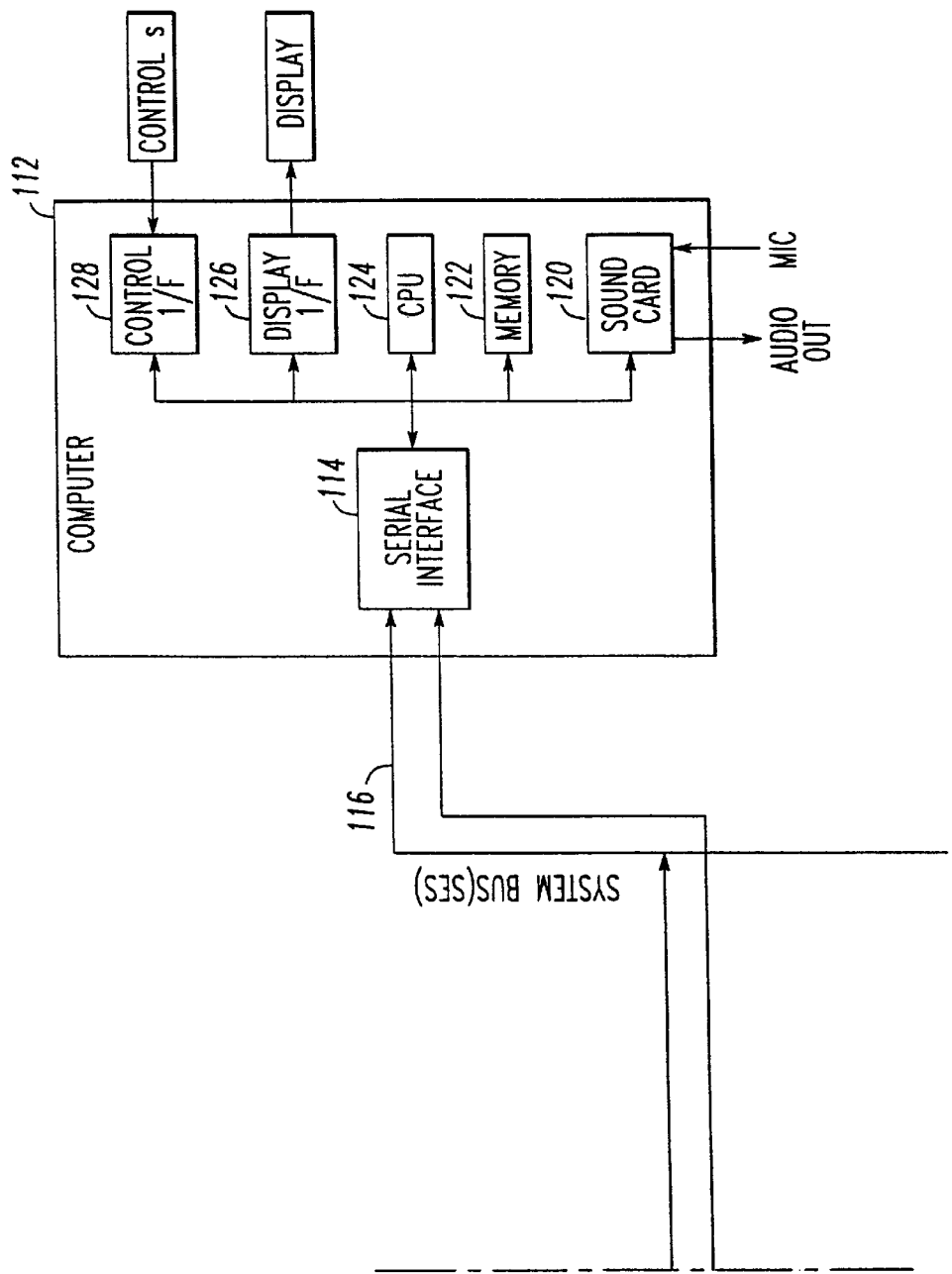

FIG. 7 illustrates signal flow in the digital submodule for an ILS application. Major components in the ILS digital receive signal path are the NB ADC 202, the FPGA1 206, the FPGA2 212, the FPGA3 214, the DDC 210, and the DSP 216. Although not utilized in the following embodiment, PDFUs 230 may be employed for more efficient or additional digital filtering, as previously discussed in the related COMMON RECEIVE MODULE FOR A PROGRAMMABLE DIGITAL RADIO. The NB ADC 202, receives an analog input signal and outputs digital data samples. The FPGA1 206 controls data flow between the NB ADC 202, the DDC 210, the DSP 216 and, if employed, the PDFU(s) 230. The FPGA2 inputs parallel data and transmits serial output data onto system bus 116. The DDC 210 performs downconversion and decimation. For the ILS application, the DSP 216 performs signal processing, including envelope detection, filtering, AGC, Discrete Fourier Transform (DFT), threshold detection, decoding, and message formatting. Also if desired, algorithms for other functions such as automatic frequency control (AFC) can be easily implemented by those of skill in the art.

For example, AFC could be performed by routing output from the DDC 210 through the FPGA1 206 to the DSP 216 which, perhaps in conjunction with the FPGAs 206, 212 and 214, performs an AFC algorithm that derives a tuning error. The tuning error is then used to correct tuning of the DDC 210. The flexibility of the processing architecture disclosed herein permits some of these DSP operations to be performed in other units if desired such as in the FPGAs 206, 212, 214, and, if employed, the PDFU(s) 230.

The digital submodule 106, via the FPGA3 214, also controls resources of an associated channel, including the analog submodule 104 via the tune bus 228 and the AIU 103 associated with the channel via the AIU control bus 130. Such control information is either derived internally by the digital submodule 106 which provides settings for automatic gain control (AGC) based upon received signals levels, or is derived externally to provide tuning information via the system bus 116 from, for example, a control (not shown) associated with the computer 112.

All external interfaces to the digital submodule 106 through the FPGA2 212 and the FPGA3 214 are via the line transceivers 217 and 215. Use of the line transceivers 217 and 215 improves electrical isolation previously described in conjunction with descriptions of the tune bus 228 and the AIU control bus 130.

The FPGA3 214 is coupled to the local bus 218 and the tune bus 228. The FPGA3 214 performs receiver control functions in response to a control word received from the DSP 216 over the local bus 218. Software in the DSP 216 formats a tune word which includes tuning information and other information such as switch settings for IF signal routing in the analog submodule 104 and AGC levels. The DSP 216 transmits the tune word to the FPGA3 214. The FPGA3 214 then transmits the tune word data serially over the tune bus to the analog submodule 104 as previously described. In the existing embodiment the tune word is 56 bits; however, the flexibility of the processing and control architecture disclosed herein permits words of different size based upon future requirements such as finer steps in the tunable LO1/270 of the analog submodule 104. Also, different tune words can be sent at different rates for different functions. For example, a single tune word need only be sent for a PCRM that is set at a single frequency for a relatively long period. On the other hand, AGC updates may be sent at modest rates.

Similarly, control information is sent to the AIU 103 associated with the channel via the AIU control bus 130. The control information sent depends upon the overall system design for the ILS function. For example, the AIU control information can include automatic gain control (AGC) settings based upon a received signal level. Also, control signals could switch inputs from LOC, MB and GS antennas in synchronism with processing performed in PCRM 100. On the other hand, such antenna inputs may be merely added via an RF summer unit or frequency multiplexer, as is well known to those of skill in the art. However, switch control signals could route the LOC, MB and GS signals through different paths, e.g., for different filtering and amplification. In addition, in order to meet stringent interference requirements, tuning information could be supplied to tunable preselectors in the AIU 103.

After the analog submodule 104 has been tuned to the desired frequency, the analog signal is received and down-converted in the analog submodule 104 and then output. The output of the analog submodule 104 is a narrow band signal (NB) 226, preferably, for example, near 1 MHz, that is sent to an ADC such as the 14 bit, 4 MHz NB ADC 202. Data samples are routed through the switch 204 to the FPGA1 206. Data is latched into the FPGA1 206 on a low-to-high transition of a data valid signal from the ADC 202. The FPGA1 206 then outputs the latched data in its internal register to the DDC 210. Synchronization is achieved by using an input clock to the DDC 210 derived from the data valid pulse and a clock such as a 40 MHz clock.

The digital signal samples are then provided to the DDC 210 for digital down conversion. For ILS processing, the DDC 210 accepts real input data samples at selected frequency, for example a signal near a 1 MHz frequency that is sampled at a 4 MHz input sampling rate.

The DDC 210 generates pairs of in-phase (I) and quadrature phase (Q) data that are frequency downconverted (i.e., translated) to baseband (i.e., centered on DC) via a sinusoid generator, referred to as a numerically controlled oscillator (NCO) 254, which generates both in-phase (I) (i.e., cosine) and quadrature phase (Q) (i.e., sine) local oscillator signals, and I and Q digital mixers 250 and 252. The step size of a tunable LO1 270 in the analog submodule 104 is not sufficiently fine to frequency translate every LOC and GS channel (as well as channels for other radio functions) to the same frequency, for example, 1 MHz, at the output of the analog submodule 106; therefore, most LOC and GS channels will possess slightly different frequencies (e.g., offset from 1 MHz) at the input to the DDC 210. This offset is accommodated by tuning the NCO 254, which typically has more than adequate tuning resolution of less than 1 Hertz, to a frequency of the real input data sample input to the DDC 210.

The I represents the real, mixed cosine or "in-phase" part of the data and Q represents the imaginary, mixed sine or "quadrature" part of the data. The I and Q data are then decimated (i.e., the sampling rate is reduced) from the input sampling rate (e.g., at 4 MHz) to an output I/Q pair rate of 25 KHz or 50 KHz, for example, depending on the ILS processing mode. The output decimation rates are chosen to provide at least a Nyquist sampling rate for the signal bandwidths of interest, including frequency drift. For ILS, for example, these bandwidths may be 25 KHz for the LOC and MB signals, and 50 KHz for the GS signal. Additionally, the DDC 210 includes filters, an output formatter, and control logic.

Frequency translation tuning to baseband and decimation rates are controlled by control words loaded into the DDC 210 during the tune period. The disclosed processing architecture permits various methods for loading these control words depending upon the brand of hardware elements chosen for the DDC 210 and DSP 216. For example, control data words can be downloaded in parallel format over the local bus 218 to the FPGA1 206, parallel-to-serial converted in the proper serial format, and loaded into a control I/F port (not shown) of the DDC 210 to control DDC tuning, decimation rates, number of output bits, output data format, etc., as allowed by the specific DDC hardware.

On the other hand, as in the described embodiment, the DSP 216 provides a serial output (not shown) specifically for loading control-type data to other devices such as the DDC 210. In this case the serial output from the DSP 216 may either be connected directly to the DDC 210, if the serial bus formats can be made compatible by programming the DSP 216 and/or the DDC 210, or the serial control connection can be routed through the FPGA1 206, which reformats the control data into a form suitable for the DDC 210.

Outputs from the DDC 210 are transferred back to the FPGA1 206. The DDC outputs include I/Q data and, in the preferred embodiment, a synchronization clock signal and a real control signal for each sample. The clock signal is generated by the DDC 210. The real control signal indicates whether the output data is real (I) or imaginary (Q). The I/Q data from the DDC 210 (e.g., serial 20-bit data) is received by the FPGA1 206, formatted into a data word usable with the local bus 218 (e.g., formatted via serial-to-parallel conversion into a 32-bit data word usable with the TMS-320 C31 DSP) and latched into a register in the FPGA1 206. Then, the FPGA1 206 raises a sampling interrupt in the DSP 216, signalling that a sample is available. The software in the DSP 216 responds to the sampling interrupt by reading data from an address mapped into a register in the FPGA1 206 containing the data sample. The data read from the FPGA1 206 is then stored in the RAM 220 prior to processing in the DSP 216.

Figure 8:
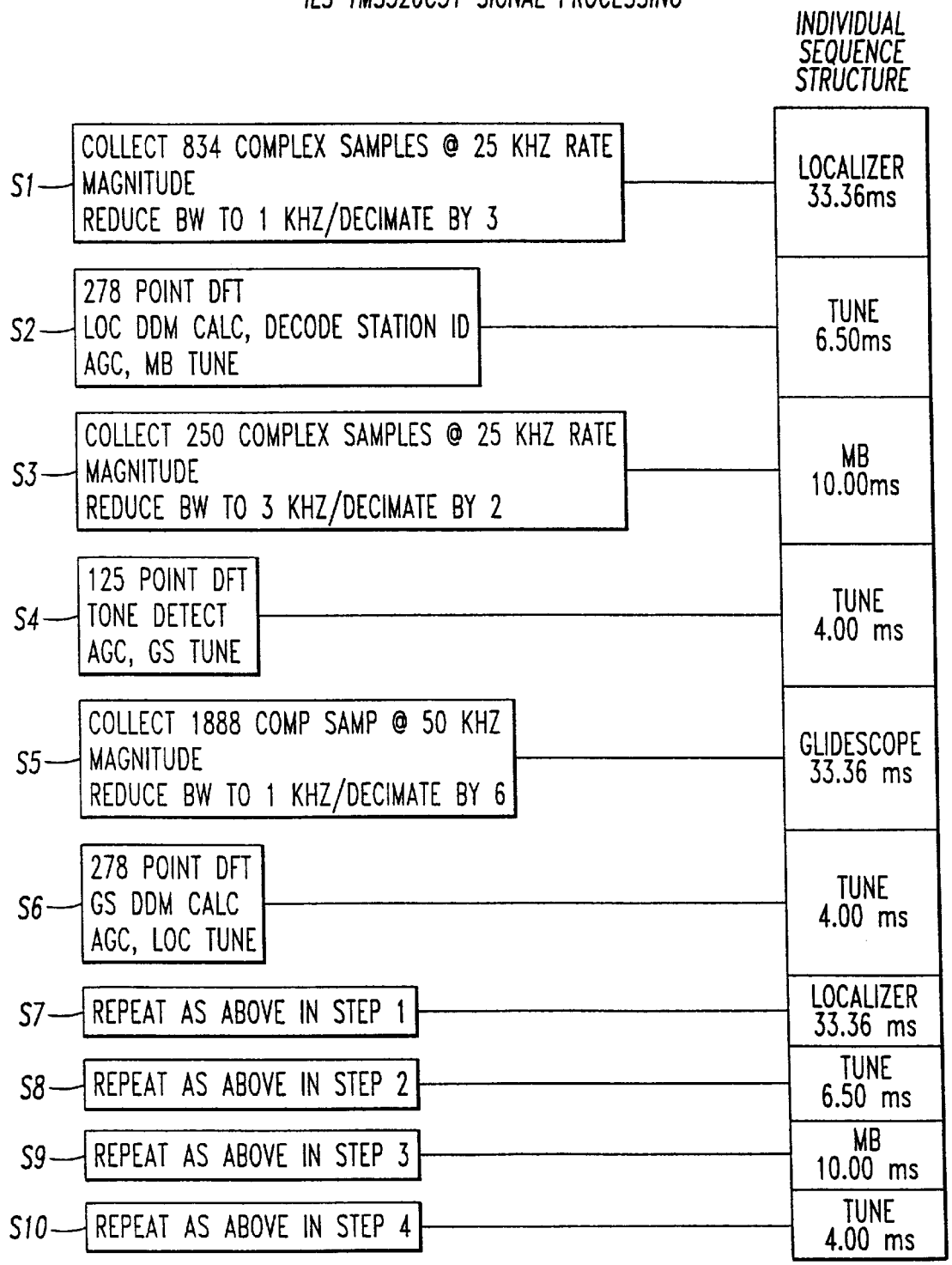
FIG. 8 illustrates an individual sequence structure of signal processing which occurs in a central processing unit configured for the Instrument Landing System.
Figure 9:
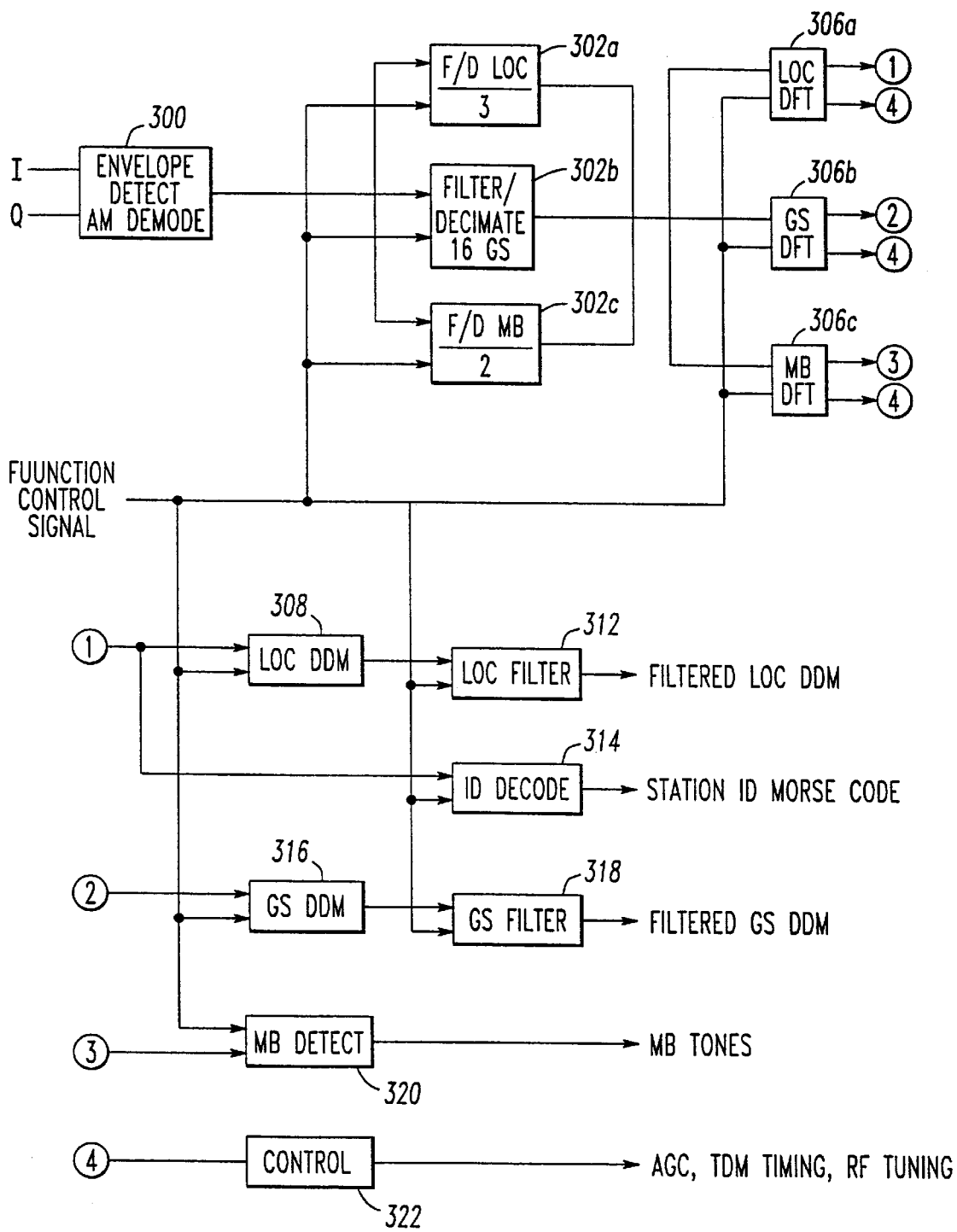
FIG. 9 illustrates signal processing which occurs in the central processing unit configured for the Instrument Landing System.

An example of processing in the DSP 216 is illustrated in FIG. 8 and FIG. 9. All of the operations noted on these figures are performed by software loaded in the DSP 216. The processing is described below for each ILS operating mode.

As illustrated in FIG. 8, in step S1 during LOC processing, sampling interrupts will occur every 20 usec, corresponding to a 50 KHz rate. A complete I and Q data pair will therefore be received every 40 usec, corresponding to a 25 KHz rate.

As shown in FIG. 9, envelope detect 300 performs an envelope detect operation on each pair of I and Q data samples. The output of the envelope detect 300 is a real-valued signal magnitude. A total of 834 magnitude samples will be collected during the 33.36 msec LOC sampling period (FIG. 8). The magnitudes are then filtered and decimated by LOC filter/decimate 302a, to reduce the number of data samples to be processed. Decimation by a factor of 3 reduces the number of magnitude samples from 834 to 278 and the sample rate to 8.333 KHz. A decimated output signal is produced.

In step S2 for LOC processing, and during the MB tune period (FIG. 8), an LOC discrete fourier transform unit LOC DFT 306a (FIG. 9) performs 278-point DFT at 0 Hz, 90 Hz, 150 Hz and 1020 Hz on the decimated output signal to produce 0 Hz, 90 Hz, 150 Hz and 1020 Hz outputs. The 0 Hz, 90 Hz, 150 Hz outputs of the DFT are supplied to LOC difference-in-depth-of-modulator, LOC DDM 308, which performs a DDM processing to produce a DDM result. The 1020 Hz DFT output is used by an identification decoder 314 to decode a station ID morse code. A DDM result from LOC DDM 308 is filtered by a LOC Filter 312 to dampen effects of any transients in the DDM result. Also, measurement of a signal level of the DDM result is used for AGC settings as desired by the user. For example, for AGC settings in the analog submodule 104 and, if desired, for AGC settings in the AIU 103 associated with the channel. The AGC settings are preferably determined by a lookup table in the RAM 220 based upon signal strength level.

Use of DFT 306a measurements for AGC will set AGC levels according to in-channel signal strength. Other signal monitoring methods for AGC are possible as desired during system design. For example, a signal level on the ADC 202 can be monitored directly, e.g., by monitoring an ADC MSB, in order to set AGC levels according to the total signal level, both in-channel and out-of-channel, incident on the ADC 202. The LOC DDM outputs are formatted and placed in a system bus message for transmission to an external ILS display device via the system bus 116. The Station ID morse code can be transmitted by various methods and as desired by the system designer according to a chosen protocol for the system bus 116. These methods include:

(1) Passing individual pulses of the station ID morse code to the external computer 112 for decoding and subsequent audio output via a sound card 120 and/or display on a display unit 126;

(2) Storing an entire station ID morse code sequence of the code pulses in the RAM 220 prior to transmitting the station ID morse code sequence to the computer 112 for decoding, etc.;

(3) Digitally forming tones and transmitting the tones to sound card 120 to produce an audio output, and, if desired, for decoding and subsequent display on display unit 126.

Also during step S2 (FIG. 8), appropriate resources in the analog submodule 104, the digital submodule 106 and the AIU 103 associated with the channel are selected and tuned under control of the DSP 216 using data transmitted over associated buses as previously described, in this case to receive and process the signal for the MB channel. Reconfiguring the FPGAs 206, 212 and 214 when time multiplexing among the LOC, MB and GS functions is not necessary.

During the next tune period for LOC, e.g., in step S6 (FIG. 8), the LOC AGC data is passed, if desired, to the analog submodule 104 via the tune bus 228 and, also if desired, to the AIU 103 associated with the channel via AIU control bus 130.

In step S3 during MB processing, sampling interrupts will occur every 20 usec, corresponding to a 50 KHz rate. A complete I and Q data pair will therefore be received every 40 usec, corresponding to a 25 KHz rate. The envelope detector 300 (FIG. 9) performs an envelope detect operation on each pair of I and Q data samples. The output of the envelope detector 300 is a real-valued signal magnitude. A total of 250 magnitude samples will be collected during the 10 msec MB sampling period. The magnitudes samples are then filtered and decimated by a MB filter/decimate 302c to reduce the number of data samples to be processed and a decimated signal is produced. Decimation by a factor of 2 reduces the number of magnitude samples from 250 to 125 and a sample rate of the decimated signal is reduced to 12.5 KHz. The decimation factor is chosen to reduce the number of MB samples to a whole number for processing simplicity while still maintaining a sufficiently high sample rate and number of samples.

In step S4 (FIG. 8) a 125-point DFT is performed by a MB DFT 306c at 0 Hz, 400 Hz, 1300 Hz, and 3000 Hz to produce DFT results. The DFT results are used by a MB Detector 320 to detect via a threshold setting, a presence of an outer (400 Hz), a middle (1300 Hz), and an inner (3000 Hz) MB tone and thus, produce MB outputs. The MB outputs are then formatted and placed in a system bus message for transmission to the external ILS display device 126 and the external tone generator which is not shown but preferably included in sound card 120. If desired by the system application, tones can be formed digitally and transmitted to the sound card 120 similar to that described in conjunction with the VHF AM description, described later.

Additionally, if desired by the system application, AGC can be performed similar to AGC for the LOC function and AGC data can be sent to appropriate unit (e.g., analog submodule 104 and/or AIU 103) during the next MB tune period, for example in step S8 (FIG. 8). Also during step S4, appropriate resources in the analog submodule 104, digital submodule 106 and the AIU 103 associated with the channel are selected and tuned under control of the DSP 216 via data transmitted over associated buses as previously described, in this case to receive and process the signal for the GS channel.

In step S5 (FIG. 8) during GS processing, sampling interrupts occur every 10 usec, corresponding to a 100 KHz rate. A complete I and Q data pair will therefore be received every 20 usec, corresponding to a 50 KHz rate. The envelope detector 300 (FIG. 9) performs an envelope detector operation on each pair of I and Q data samples. The output of the envelope detector 300 is a real-valued signal magnitude. A total of 1668 magnitude samples are collected during the 33.36 msec GS sampling period. The magnitude samples are then filtered and decimated (GS Filter/Decimate 302b) to reduce the number of data samples to be processed. Decimation by a factor of 6 reduces the number of magnitude samples from 1668 to 278 and reduces the sample rate to 8.333 KHz.

In step S6, a GS DFT 306b performs a 278-point DFT at 0 Hz, 90 Hz, and 150 Hz. The 0 Hz, 90 Hz, 150 Hz outputs of the DFT are used by a GS DDM 316 to compute a GS difference-in-depth-of-modulation and produce a DDM result. The DDM result is filtered by a GS Filter 318 to dampen the effect of any transients in the DDM result and GS outputs are produced. The GS outputs are formatted and placed in a system bus message for transmission to an external ILS display device interface such as Display I/F 126 (FIG. 7). If desired by the system application, AGC can be performed similarly to that performed for the LOC function and AGC data can be sent to an appropriate unit (e.g., the analog submodule 104 and/or the AIU 103) during the next GS tune period. Also during step S6, appropriate resources in the analog submodule 104, the digital submodule 106 and the AIU 103 associated with the channel are selected and tuned under control of the DSP 216 via data passed over the associated buses as previously described, in this case to receive and process a signal for the LOC channel.

Steps S7 through S10 repeat steps S1 through S7, respectively, with the entire sequence of steps S1 through S6 being repeated during a period the digital submodule is configured for the ILS application.

Figure 10:
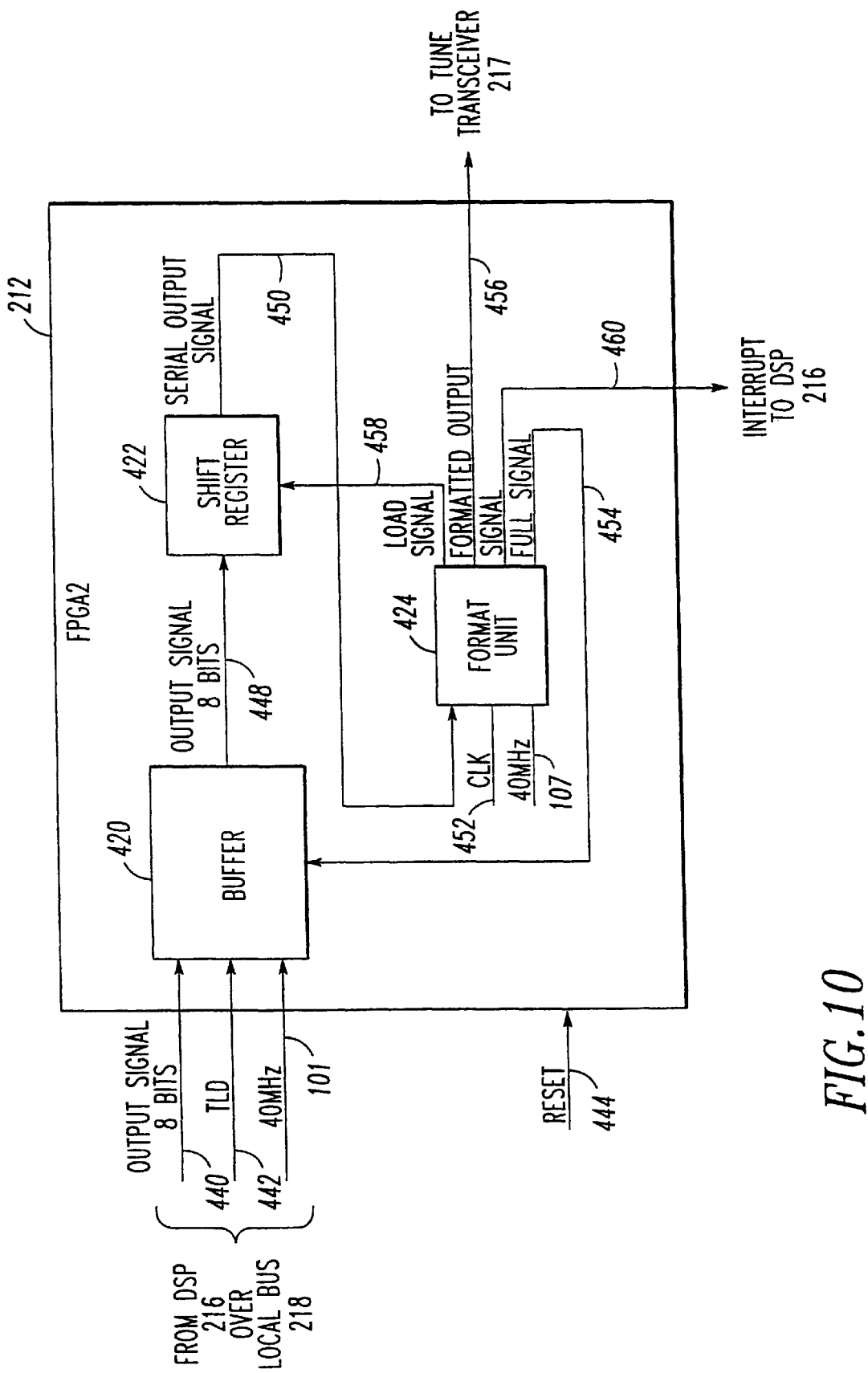
FIG. 10 is a diagram of a second field programmable array for the digital submodule configured for the Instrument Landing System.

Data is output over the system bus 116 using the Universal Asynchronous Receiver Transmitter (UART) capability programmed into FPGA2 212. FIG. 10 is a block diagram of the FPGA2 212. The FPGA2 212 receives an 8 bit data word 440, and loads it into the 8-bit buffer 420 with a transmit load data (TLD) signal 442. The TLD signal 442 is derived from an address decode of the buffer 420 address. When the software in the DSP 216 writes to the address of buffer 420, the TLD signal 442 will be set. A FULL signal 454 is derived from control logic in a format unit 424. The FULL signal 454 is set when a new byte is deposited into the buffer 420.

If a shift register 422 is empty, the byte in the buffer 420 will be transferred in parallel to the shift register 422. When data is transferred into the shift register 422, the FULL signal 454 will be reset and an interrupt 460 will be sent to the DSP 216 indicating that the buffer 420 is empty and ready for a new byte. If the shift register 422 is not empty, the transfer of the next byte into the shift register 422 from the buffer 420 will not occur until the last bit of the shift register 422 is shifted out. The format unit 424 uses signals baud rate CLK 452, and a digital submodule clock 107 of, for example, 40 MHz, provides synchronization of data flow between the buffer 420, the DSP 216, and the shift register 422.

By the process described above, an Instrument Landing System which performs efficiently and accurately can be achieved within a programmable common receive module. Those of skill in the art can use the above description plus application notes and functional requirements documents to use or modify the programmable common receive module disclosed herein for reception and processing of other time-interleaved waveforms including various combinations or amplitude, frequency and/or phase modulated waveforms.

For example, functional unit capacity can be added, either through additional or larger capacity units such as the DDC 210, the PDFU 230, the FLASH 222, the RAM 220, the DSP 216, and the FPGAs 206, 212 and 214. Additional capacity could be added to transceivers such as 215 and 217 for additional I/Os to external units or between the analog submodule 104, digital to analog converter portion 106a and the digital processing portions 106b of the PCRM 100. Moreover, any or all of these functional units such as the FPGAs 206, 212 and 214, or the ADCs 200 and 202 could be consolidated into units of larger functional usage, in order to reduce overall size and also to reduce costs such as resulting from fewer parts count and large scale manufacturing of units that are common among a wide variety of radio applications and a wide variety of integrated system applications.

Specifically, as technology improves it is anticipated that the ADCs 200 and 202 of the PCRM 100, can be replaced by a dual mode ADC that can operate at both of the required rates or perhaps at a single rate (e.g., the 40 MHz rate) provided the NB ADC 202 dynamic range requirements can be met for the NB signals, such as by using the AD9042 available from analog devices which provides 12 bits at 40 Mhz. In this latter case the 40 MHz sampling rate is decimated to 4 MHz to maintain compatibility with the digital down conversion and to approximately maintain the same dynamic range (via the decimation process) as the 14-bit NB ADC. Moreover, a higher speed ADC such as AD 9042 could also be used to sample both the WB IF output (e.g., at 30 MHz) and the NB IF output (e.g., at 1 MHz) and thus require only a single ADC. The higher dynamic range of this high-speed (e.g., 40 MHz) ADC would be sufficient to eliminate a sequential detection log video amplifier (SDLVA) 1261 and associated circuitry in analog submodule 104 (FIG. 4). However, an IF limiter could still be employed to replace the limited IF output 1261a. Also, use of a higher (e.g., 40 MHz) sampling rate for the 1 MHz IF output path instead of a lower (e.g., 4 MHz) sampling rate does not necessitate that the LO3 signal to multiplier 1263 be an exact multiple (e.g., 32 MHz) of the lower sampling rate to cause aliased ADC sample harmonics to fall at zero Hz, thus simplifying LO3 (in this example allowing LO3 to be equal to 30 MHz) and replacing the relatively complex circuits of the multiplier 1265 and the divider 1267 with a simpler divide-by-4 (not shown). In this latter case, a band pass filter (BPF) 1269 at 32 MHz would be replaced with a BPF at 30 MHz. In addition, as technology improves it is anticipated that the A/D conversion can be done prior to various downconverting stages performed in the analog submodule 104.

Additionally, the DSP 216 may include more than one processor depending on the desired functions to be performed.

The individual functions described herein of the reconfigurable format unit, which is, for example, comprised of the FPGAs 206, 212 and 214, can be modified or rearranged among the different FPGAs by the programmer. Additionally, the functionality described herein can also be included into a single large FPGA when such single large FPGA exists. Further, a single or multiple FPGAs can be programmed by those of skill in the art, particularly with the application notes available with these units, to perform not only the functions previously described for the FPGAs 206, 212 and 214 but, as later noted, other functions in conjunction with the unique, flexible and functionally efficient digital processing architecture described herein consisting of the various functionality provided by units such as the DDC 210, the FPGAs 206, 212 and 214, the PDFU 230, the DSP 216, the FLASH 222 and the RAM 220.

Moreover, FPGAs need not be used, but instead, any devices which perform these types of functions may be substituted. As noted previously, not all external buses are used for every radio application. In addition, those of skill in the art can configure the FPGAs to supply interfaces with other units, including the interfaces described previously, where such interfaces may be serial or parallel, unidirectional or bidirectional, synchronous or asynchronous as warranted, to include both standard or custom protocols. The I/O pins are included on a PCRM I/O connector, and these pins can be utilized as any of the buses noted herein or as additional buses defined by the user. How the buses are employed, their physical implementation as serial or parallel, and their connections to other modules are determined by the module interconnection scheme (e.g., wiring harness, backplane) that is employed by the system application desired by the user.

None of the above changes, additions or deletions of any of the functionality for reasons such as improved performance, size, cost or power dissipation will invalidate the unique analog/digital architecture disclosed herein, in particular the unique, flexible and functionally efficient flexible digital processing architecture disclosed herein.

A programmable common radio according to the present invention has the following advantages.

Radio frequency signals corresponding approximately to 2–2000 MHz can be input and a relatively low speed serial bit stream may be output by the programmable common receive module.

The programmable common radio may be programmable to receive and demodulate many CNI radio functions including interrogation functions, and the digital submodule may be included in a same box with the analog submodule for the programmable common receive module, which may be, for example, a plug-in module of a small size. Further electrical isolation of the digital submodule from the analog submodule may be achieved.

The digital submodules include programmable FPGAs and signal processors for performing a variety of signal processing functions. Additionally, the digital submodule of the programmable common receive module can handle pulse trains operating in different modes, such as Localizer, Glideslope and Marker Beacon.

The digital radio is functionally designed for minimal hardware although it may be appreciated that higher levels of integration are possible to reduce size even further. In addition, ASICs need not be used to achieve the structure and function of the programmable digital radio.

The present invention provides navigation functions in a system which is easily programmable for various types of radio communications, while traditional systems use fixed function analog circuitry and cannot be reprogrammed.

Although a few preferred embodiments of the invention have been shown and described, it will be appreciated by those skilled in the art that changes may be made in these embodiments, without departing from the principles and spirit of the invention, the scope of which is defined in the claims and their equivalents.

What is claimed is:

1. A programmable radio comprising:
    an antenna for receiving RF signals corresponding to different radio modes;
    an analog submodule, coupled to said antenna and dynamically programmably reconfigurable for operation in each of the different radio modes in a time-interleaved sequence, for selectively frequency translating the RF signals corresponding to the different radio modes to provide corresponding IF signals;
    a digital submodule, coupled to said analog submodule, for digitally processing the IF signals to provide output signals for each of the different radio modes and for generating control signals for respectively reconfiguring said analog submodule for operation in each of the different radio modes;
    said digital submodule being dynamically programmably reconfigured in synchronism with the time-interleaved sequence into respective different configurations for operation in each of the different radio modes; and
    display means, coupled to said digital submodule, for providing mode information to a system user for each of the different radio modes in the time-interleaved sequence;
    said digital submodule comprising:
        at least one field programmable gate array dynamically reconfigurable into the respective different configurations to perform digital processing during each of the different radio modes;
        a narrowband analog/digital converter, coupled to said analog submodule, for converting the IF signals into digital signals;
        a digital downconverter, coupled to said narrowband analog/digital converter, for respectively generating and mixing in-phase and quadrature local oscillation signals with the digital signals to output in-phase and quadrature signals; and
        a filter, coupled to said digital downconverter, for selectively decimating the in-phase and quadrature signals based on the current radio mode of the in-phase and quadrature signals;
    said at least one field programmable gate array storing the decimated in-phase and quadrature signals, said digital submodule further comprising:
        digital signal processing means, coupled to said at least one field programmable gate array, for performing envelope detection on the stored in-phase and quadrature signals, selective discrete fourier transformation of the envelope detected signal based on the current radio mode of the envelope detected signal and selective difference in depth demodulation of the fourier transformed signal based on the current radio mode of the fourier transformed signal to provide the output signal of said digital submodule.

2. The programmable radio of claim 1, wherein said digital submodule further comprises a memory for storing configuration data which is supplied to said at least one field programmable gate array to dynamically reconfigure said at least one field programmable gate array into the respective different configurations for operation in the different radio modes.

3. The programmable radio of claim 1, wherein the different radio modes are navigational radio modes.

4. The programmable radio of claim 3, wherein the navigational radio modes include localizer, marker beacon and glidescope modes.

5. The programmable radio of claim 1, wherein said analog and digital submodules are dynamically sequentially reconfigurable and tuned to route and process the RF signals during operation in the different radio modes such that the time-interleaved sequence is repetitive.

6. The programmable radio of claim 1, wherein said digital submodule further comprises control processing means for generating and outputting timer interrupts to said analog submodule for controlling the length of tuning periods of each of the different radio modes.

7. The programmable radio of claim 1, wherein the time-interleaved sequence is software implemented.

8. A programmable navigational radio comprising:
    an antenna for receiving RF signals corresponding to different navigational radio modes including localizer, marker beacon and glide slope modes;
    an analog submodule, coupled to said antenna and dynamically programmably reconfigurable for operation in each of the different navigational radio modes in a time-interleaved sequence, for selectively frequency translating the RF signals corresponding to the different navigational radio modes to provide corresponding IF signals;
    a digital submodule, coupled to said analog submodule, for digitally processing the IF signals to provide output signals for each of the different navigational radio modes and for generating control signals for respectively reconfiguring said analog submodule for operation in each of the different navigational radio modes;

said digital submodule being dynamically programmably reconfigured in synchronism with the time-interleaved sequence into respective different configurations for operation in each of the different navigational radio modes; and display means, coupled to said digital submodule, for providing navigational information to a system user for each of the different navigational radio modes in the time-interleaved sequence;

said analog and digital submodules being dynamically sequentially reconfigurable and tuned to route and process the RF signals during operation in the different navigational radio modes such that the time-interleaved sequence is repetitive;

said digital submodule comprising:
 at least one field programmable gate array dynamically reconfigurable into the respective different configurations to Perform digital processing during each of the different navigational radio modes;
 a narrowband analog/digital converter, coupled to said analog submodule, for converting the IF signals into digital signals;
 a digital downconverter, coupled to said narrowband analog/digital converter, for respectively generating and mixing in-phase and quadrature local oscillation signals with the digital signals to output in-phase and quadrature signals; and
 a filter, coupled to said digital downconverter, for selectively decimating the in-phase and quadrature signals based on the current radio mode of the in-phase and quadrature signals;

said at least one field programmable gate array storing the decimated in-phase and quadrature signals, said digital submodule further comprising:
 digital signal Processing means, coupled to said at least one field programmable gate array, for performing envelope detection on the stored in-phase and guadrature signals, selective discrete fourier transformation of the envelope detected signal based on the current navigational radio mode of the envelope detected signal and selective difference in depth demodulation of the fourier transformed signal based on the current navigational radio mode of the fourier transformed signal to provide the output signal of said digital submodule.

9. The programmable navigational radio of claim 8, wherein said digital submodule further comprises a memory for storing configuration data which is supplied to said at least one field programmable gate array to dynamically reconfigure said at least one field programmable gate array for operation in the different navigational radio modes.

10. The programmable navigational radio of claim 8, wherein said digital submodule further comprises control processing means for generating and outputting timer interrupts to said analog submodule for controlling the length of tuning periods of each of the different navigational radio modes.

11. The programmable navigational radio of claim 8, wherein the time-interleaved sequence is software implemented.

* * * * *